US012782144B2

(12) United States Patent
Tsujimoto et al.

(10) Patent No.: US 12,782,144 B2
(45) Date of Patent: Nov. 3, 2026

(54) NAVIGATION ASSISTANCE DEVICE AND NAVIGATION ASSISTANCE METHOD

(71) Applicant: Furuno Electric Co., Ltd., Nishinomiya (JP)

(72) Inventors: Kazuki Tsujimoto, Amagasaki (JP); Tatsuya Sonobe, Ikeda (JP); Hiroyuki Toda, Nishinomiya (JP); Kazushi Takemoto, Nishinomiya (JP)

(73) Assignee: Furuno Electric Co., Ltd., NIshinomiya (JP)

( * ) Notice: Subject to any disclaimer, the term of this patent is extended or adjusted under 35 U.S.C. 154(b) by 0 days.

(21) Appl. No.: 19/070,400

(22) Filed: Mar. 4, 2025

(65) Prior Publication Data

US 2025/0198764 A1 Jun. 19, 2025

Related U.S. Application Data

(63) Continuation of application No. PCT/JP2023/031642, filed on Aug. 30, 2023.

(30) Foreign Application Priority Data

Sep. 5, 2022 (JP) ................................ 2022-140469

(51) Int. Cl.
*G01C 21/20* (2006.01)
*B63B 49/00* (2006.01)

(52) U.S. Cl.
CPC ............ *G01C 21/203* (2013.01); *B63B 49/00* (2013.01)

(58) Field of Classification Search
CPC ...... G01C 13/00; G01C 13/008; G01C 21/20; G01C 21/203; G01C 21/22; G06F 16/29; G08G 3/02; G08G 3/00; B63H 20/12; B63H 25/04; B63B 49/00; B63B 79/04
USPC ............................................... 703/21; 701/21
See application file for complete search history.

(56) References Cited

U.S. PATENT DOCUMENTS

| | | | | |
|---|---|---|---|---|
| 5,154,561 | A | 10/1992 | Lee | |
| 11,167,833 | B2 * | 11/2021 | Akuzawa | G01C 21/203 |
| 11,609,574 | B2 * | 3/2023 | Walters | G05D 1/0206 |
| 11,691,703 | B2 * | 7/2023 | Grunewald Mayer | B63B 79/40 701/21 |
| 12,589,843 | B2 * | 3/2026 | Kottke | B63B 49/00 |
| 2011/0131050 | A1 * | 6/2011 | Zimmer | G06Q 10/08 705/1.1 |
| 2015/0158564 | A1 | 6/2015 | Miyamoto et al. | |
| 2019/0308712 | A1 | 10/2019 | Akuzawa et al. | |

(Continued)

FOREIGN PATENT DOCUMENTS

| | | | |
|---|---|---|---|
| JP | 4716214 | A | 4/2011 |
| JP | 2019162977 | A | 9/2019 |

(Continued)

*Primary Examiner* — Andrew Joseph Rudy
(74) *Attorney, Agent, or Firm* — Alleman Hall LLP

(57) ABSTRACT

The purpose is to highly accurately estimate information indicating a ship state up to the point of docking. A navigation assistance device includes a ship state detection sensor and processing circuitry. The ship state detection sensor detects a bow azimuth. The processing circuitry detects a quay line of a quay. The processing circuitry calculates a drift angle which is an angle formed between a bow stern direction of a ship and a direction in which the quay line extends, based on the bow azimuth and the quay line.

14 Claims, 19 Drawing Sheets

(56) References Cited

U.S. PATENT DOCUMENTS

| | | | |
|---|---|---|---|
| 2021/0078690 A1 | 3/2021 | Ueno | |
| 2022/0001962 A1 | 1/2022 | Krosschell et al. | |
| 2022/0028278 A1 * | 1/2022 | Hara | B63B 79/40 |
| 2022/0206496 A1 | 6/2022 | Tyers | |
| 2023/0192263 A1 | 6/2023 | Ikegaya | |
| 2025/0153838 A1 | 5/2025 | Tomita et al. | |

FOREIGN PATENT DOCUMENTS

| | | |
|---|---|---|
| JP | 2020148811 A | 9/2020 |
| KR | 101053922 B1 | 8/2011 |

* cited by examiner

NAVIGATION ASSISTANCE DEVICE AND NAVIGATION ASSISTANCE METHOD

CROSS-REFERENCE TO RELATED APPLICATIONS

This application is a continuation application of PCT International Application No. PCT/JP2023/031642, which was filed on Aug. 30, 2023, and which claims priority to Japanese Patent Application No. JP2022-140469 filed on Sep. 5, 2022, the entire disclosures of each of which are herein incorporated by reference for all purposes.

TECHNICAL FIELD

The disclosure relates to a navigation assistance technology for ships, particularly to a navigation assistance technology during undocking and docking.

Conventional Art

Conventional art describes a method and system for assisting a ship in entering and leaving port as well as undocking and docking.

In the conventional art, a target docking state of the ship is simulated and displayed.

SUMMARY

Problems to be Solved by the Invention

However, in the conventional art such as that described in Patent Document 1, it is difficult to highly accurately provide the information necessary for docking (the undocking and docking side of the ship making approximately linear contact with the quay).

Accordingly, the purpose of the disclosure is to highly accurate information necessary for docking.

Means for Solving the Problems

A navigation assistance device of the disclosure includes a ship state detection sensor, a quay information detecting unit, and a drift angle calculating unit. The ship state detection sensor detects a bow azimuth. The quay information detecting unit detects a quay line of a quay. The drift angle calculating unit calculates a drift angle which is an angle formed between a bow stern direction of a ship and a direction in which the quay line extends, based on the bow azimuth and the quay line.

In this configuration, by calculating the angle (drift angle) formed between the quay line and the bow stern direction of the ship, a speed or acceleration in a direction from the ship toward the quay where the ship is docked can be highly accurately calculated. Accordingly, highly accurate information necessary for docking can be provided.

DESCRIPTION OF THE EMBODIMENTS

A navigation assistance device and a navigation assistance method according to an embodiment of the disclosure will be described with reference to the drawings.

(Schematic Configuration of Navigation Assistance Device)

Figure 1:
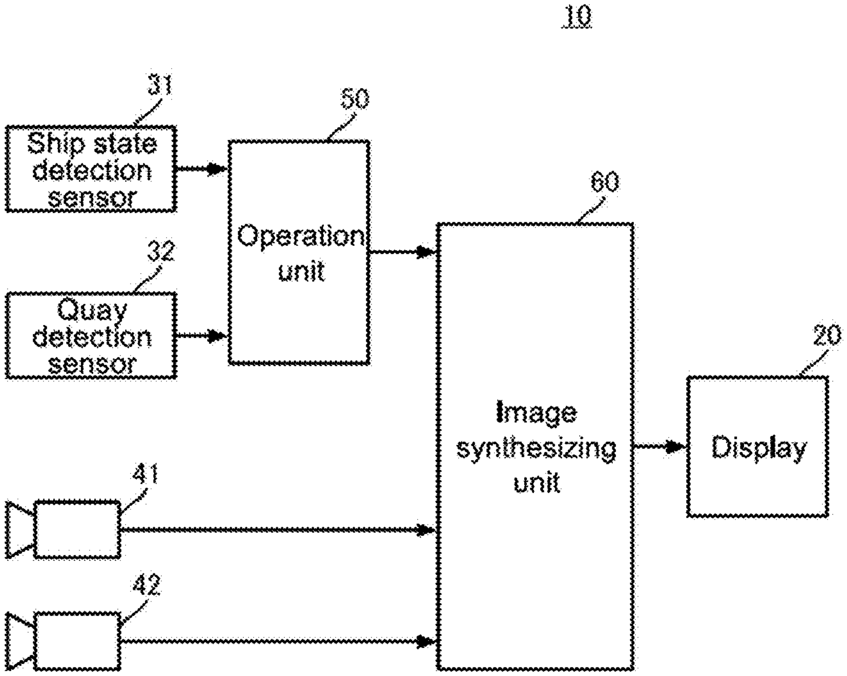
FIG. 1 illustrates one example of functional blocks of a navigation assistance device according to an embodiment of the disclosure.
Figure 2A:
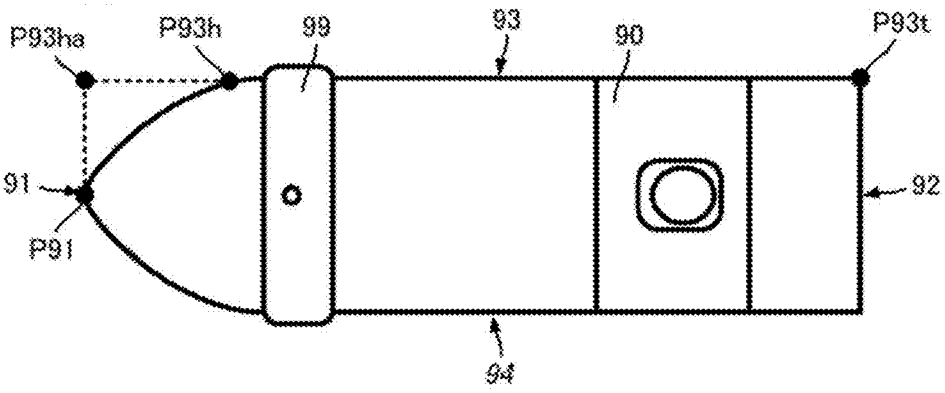
FIG. 2(A) and FIG. 2(B) illustrate one example of the shape of a ship on which the navigation assistance device is implemented.
Figure 2B:
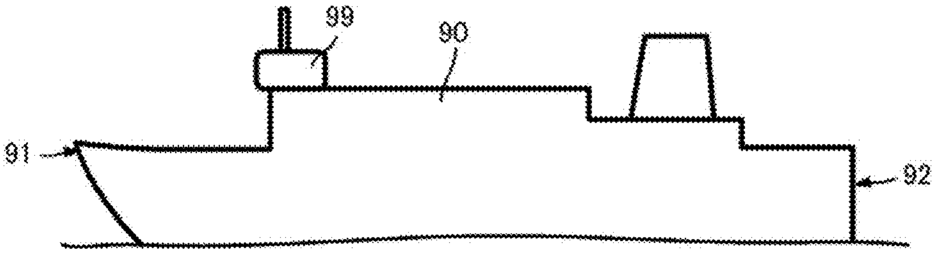

FIG. 1 illustrates one example of functional blocks of a navigation assistance device according to an embodiment of the disclosure. FIG. 2(A) and FIG. 2(B) illustrate one example of the shape of a ship on which the navigation assistance device is implemented. FIG. 2(A) is a plan view and FIG. 2(B) is a side view.

A navigation assistance technology of the present embodiment is a navigation assistance technology used when a ship performs a docking operation or undocking operation, and is particularly used during docking. For example, a docking state refers to a state during which the ship enters port, decelerates or the like while having the bow or stern close to the quay with a certain distance therebetween, and then has the undocking and docking side docked at the quay.

As illustrated in FIG. 1, a navigation assistance device 10 includes a display 20, a ship state detection sensor 31, a quay detection sensor 32, a camera 41, a camera 42, an processing circuitry 50, and an image synthesizing unit 60. The number of cameras is not limited to two.

The processing circuitry 50 is composed of a navigation assistance program that executes each processing of navigation assistance to be described later, a storage medium storing the navigation assistance program, and an operation processing device that executes the navigation assistance program. The image synthesizing unit 60 is composed of an electronic circuit. The display 20 is realized by, for example, a liquid crystal panel.

The ship state detection sensor 31 and the quay detection sensor 32 are connected to the processing circuitry 50. The cameras 41, 42, and the processing circuitry 50 are connected to the image synthesizing unit 60. The image synthesizing unit 60 is connected to the display 20.

Example of Ship and Installation Example of Navigation Assistance Device 10

As illustrated in FIG. 2(A) and FIG. 2(B), a ship 90 includes a bow 91, a stern 92, a starboard 93, a port 94, and a bridge 99. The ship 90 is, for example, a large ship such as a ferry or a tanker, with a total length of several hundred meters, a width of tens of meters, and a height of ten meters or more. Although the ship 90 may be a smaller ship, the configuration of the present embodiment effectively functions in large ships.

The ship state detection sensor 31, the quay detection sensor 32, the camera 41 and the camera 42 are, for example, installed near the bridge 99. However, the installation positions of the ship state detection sensor 31, the quay detection sensor 32, the camera 41 and the camera 42 are not limited thereto if the conditions to be described later are met.

The processing circuitry 50, the image synthesizing unit 60 and the display 20 are, for example, installed in a wheelhouse of the bridge 99. The display 20 may be a device that projects an image onto a window of the wheelhouse.

(Ship State Detection Sensor 31 and Quay Detection Sensor 32)

The ship state detection sensor 31 detects motion state data of the ship, including ship position, ship speed, ship acceleration, rate of turn, bow azimuth, and ship attitude angle. The ship state detection sensor 31 outputs the motion state data of the ship to the processing circuitry 50.

The ship state detection sensor 31 is composed of, for example, a positioning sensor using positioning signals such as GPS, an inertial sensor, and an integrated sensor integrating the positioning sensor and the inertial sensor. A specific method for detecting a motion state of the ship by the ship state detection sensor 31 is similar to known methods for detecting the motion state of the ship using the positioning sensor, the inertial sensor, and the integrated sensor, and the description thereof is omitted.

The ship state detection sensor 31 detects the ship position, ship speed (speed over ground), ship acceleration, and ship attitude angle at the installation position. The ship position is detected in an absolute coordinate system (for example, global navigation satellite system (GNSS) coordinate system or geocentric three-dimensional orthogonal coordinate system). The ship speed, ship acceleration, and ship attitude angle are detected in an absolute coordinate system or a ship body coordinate system.

The ship state detection sensor 31 detects the rate of turn and the bow azimuth of the ship 90. The rate of turn is detected in a ship body coordinate system. The bow azimuth is detected in an absolute coordinate system.

The ship state detection sensor 31 outputs the motion state (ship position, ship speed, ship acceleration, rate of turn, bow azimuth, and ship attitude angle) of the ship to the processing circuitry 50. The ship state detection sensor 31 does not necessarily have to output all the data indicating the motion state of the ship to the processing circuitry 50, and may output the minimum necessary data required for the information calculated by the processing circuitry 50.

The quay detection sensor 32 is composed of, for example, a light ranging device, specifically, light detection and ranging (LiDAR). The quay detection sensor 32 is arranged on the ship 90 so that its ranging range covers a scene outside the ship 90 on a side where the ship 90 performs undocking and docking. On this occasion, it is preferable that the ranging range of the quay detection sensor 32 includes scenes outside the bow 91 side and the stern 92 side of the ship 90.

The quay detection sensor 32 generates quay detection data including multiple feature points (for example, point clouds detected by LiDAR) obtained from a ranging result and their positions (in a quay detection sensor coordinate system), and outputs the same to the processing circuitry 50.

(Camera 41 and Camera 42)

The camera 41 is installed on the ship 90 so as to capture images of the scene on the bow 91 side on the side where the ship 90 performs undocking and docking. That is, the camera 41 is a bow side imaging camera. The camera 41 outputs imaging data (imaging data on the bow side on the undocking and docking side) to the image synthesizing unit 60.

The camera 42 is installed on the ship 90 so as to capture images of the scene on the stern 92 side on the side where the ship 90 performs undocking and docking. That is, the camera 42 is a stern side imaging camera. The camera 42 outputs imaging data (imaging data on the stern side of the undocking and docking side) to the image synthesizing unit 60.

(Operation Unit 50)

Specific configuration and processing of the processing circuitry 50 will be described later. The processing circuitry 50 generates navigation assistance data based on the motion state data of the ship from the ship state detection sensor 31 and the quay detection data from the quay detection sensor 32.

Figure 3A:
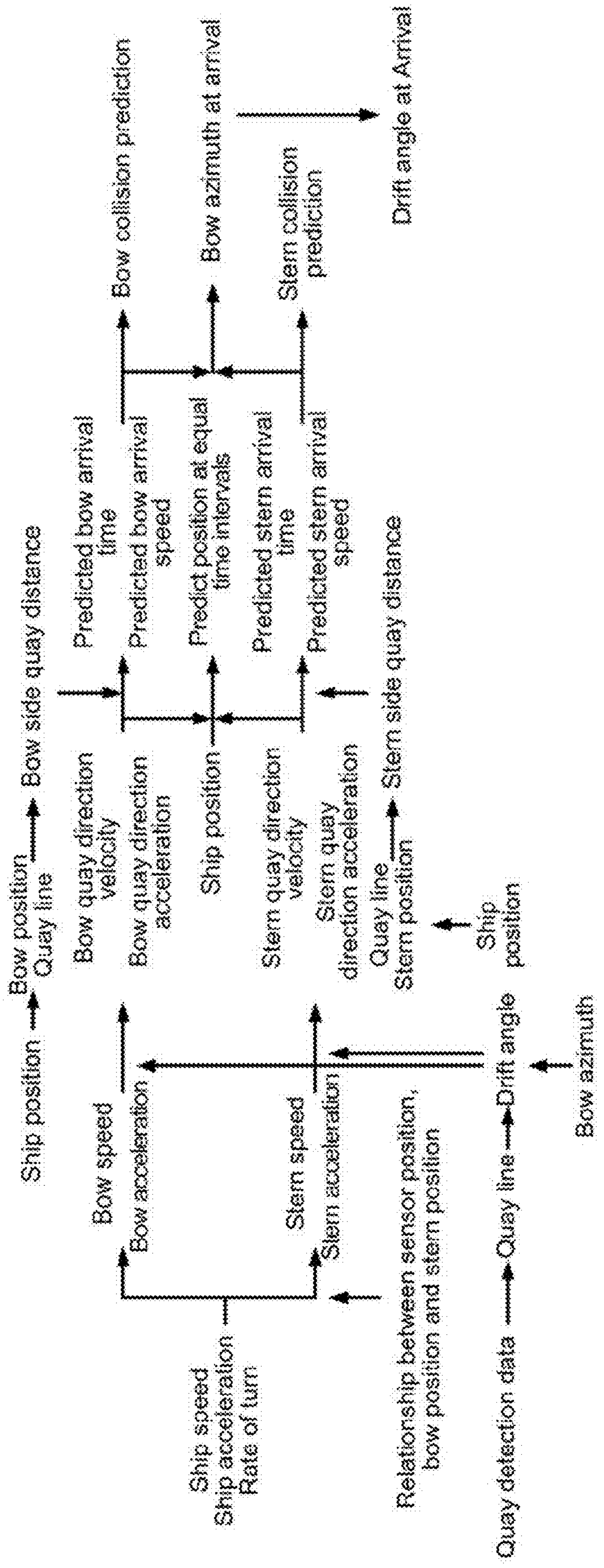
FIG. 3(A), FIG. 3(B), and FIG. 3(C) illustrate one example of a general flow of processing executed by an processing circuitry.
Figure 3B:
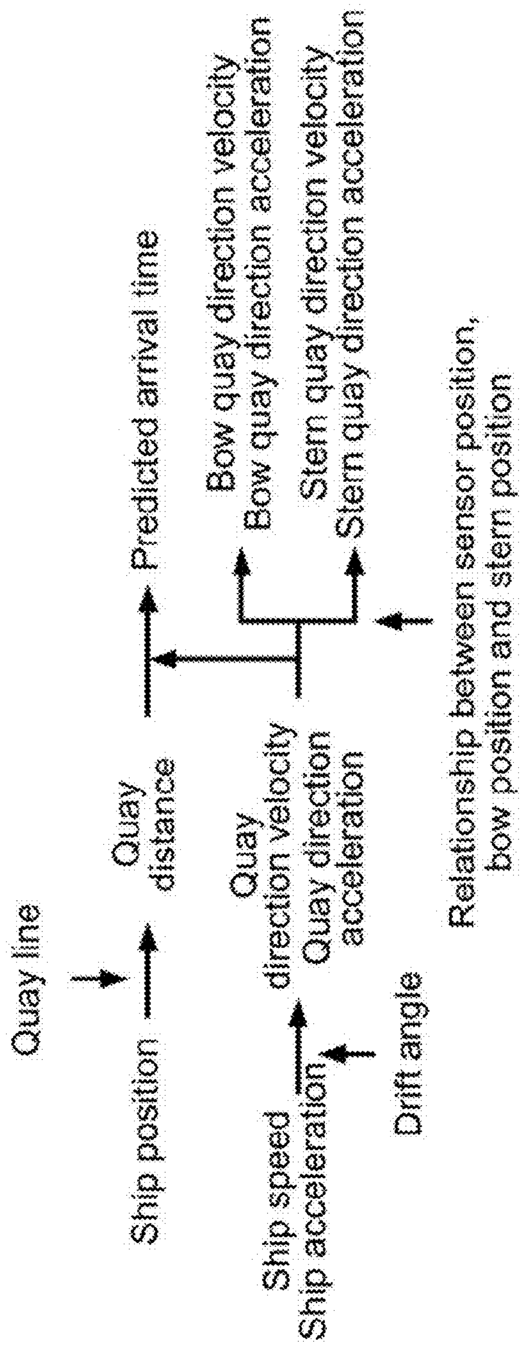
Figure 3C:
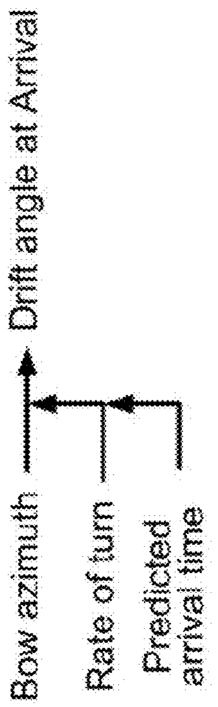

FIG. 3(A), FIG. 3(B), and FIG. 3(C) illustrate one example of a general flow of processing executed by an processing circuitry. A schematic processing of the processing circuitry 50 is described below with reference to FIG. 3(A), FIG. 3(B), and FIG. 3(C).

The processing circuitry 50 stores in advance relationships in the absolute coordinate system, the ship body coordinate system, and a coordinate system of the light ranging device, and stores coordinate transformation matrices between each of them. In calculating each type of information described later, the processing circuitry 50 performs the calculation using a coordinate transformation in the case where the coordinate transformation is necessary.

(Quay Line, Position Coordinates of Quay Line, and Quay Line Azimuth)

The processing circuitry 50 detects the quay line from the quay detection data, and detects the position coordinates of the quay line and quay line azimuth.

(Bow Speed, Bow Acceleration, Stern Speed, and Stern Acceleration)

The processing circuitry 50 calculates the bow speed, bow acceleration, stern speed, and stern acceleration based on the ship speed, ship acceleration, and rate of turn in the motion state data of the ship. The processing circuitry 50 stores in advance a positional relationship between the installation position of the ship state detection sensor 31 and each of a bow position P91 or a bow position P93*h* of the undocking and docking side and a stern position P93*t* of the undocking and docking side. The processing circuitry 50 calculates the bow speed, bow acceleration, stern speed, and stern acceleration based on this positional relationship. In the following, as one example, a case is illustrated where the stern position P93*t* is adopted for the stern 92 side when the bow position P91 is adopted for the bow 91 side. However, similar processing is performed in the case where the bow position P93*h* is adopted instead of the bow position P91. Furthermore, an intersection point position of an extension line in the bow 91 direction of the undocking and docking side and a line orthogonal to this extension line and passing through the bow position P91 may be taken as a bow position P93*ha*. In this case, similar processing is performed.

(Drift Angle)

The processing circuitry 50 calculates a drift angle between the ship 90 and the quay line based on the bow azimuth and the quay line azimuth. The drift angle is an angle formed between the quay line and an axis extending in a direction (bow stern direction) of connecting the bow 91 and the stern 92 of the ship 90.

(Bow Quay Direction Velocity, Bow Quay Direction Acceleration, Stern Quay Direction Velocity, and Stern Quay Direction Acceleration)

The processing circuitry 50 calculates bow quay direction velocity and bow quay direction acceleration based on the bow speed, bow acceleration, and drift angle. The bow quay direction velocity is a velocity (horizontal direction velocity) in a direction of a perpendicular line dropped from the bow position P91 toward the quay line (quay line near the undocking and docking side). In other words, the bow quay direction velocity is a velocity toward a point on the quay line that is at a shortest distance from the bow position P91. The bow quay direction acceleration is acceleration (horizontal direction acceleration) in the direction of the perpendicular line dropped from the bow position P91 toward the quay line. In other words, the bow quay direction acceleration is acceleration toward a point on the quay line that is at a shortest distance from the bow position P91.

The processing circuitry 50 calculates stern quay direction velocity and stern quay direction acceleration based on the stern speed, stern acceleration, and drift angle. The stern quay direction velocity is a velocity (horizontal direction velocity) in a direction of a perpendicular line dropped from the stern position P93*t* toward the quay line (quay line near the undocking and docking side). In other words, the stern quay direction velocity is a velocity toward a point on the quay line that is at a shortest distance from the stern position P93*t*. The stern quay direction acceleration is acceleration (horizontal direction acceleration) in the direction of the perpendicular line dropped from the stern position P93*t* toward the quay line. In other words, the stern quay direction acceleration is acceleration toward a point on the quay line that is at a shortest distance from the stern position P93*t*. In the above example, as illustrated in FIG. 3(A), the processing circuitry 50 calculates bow speed and stern speed based on the ship speed and ship acceleration as well as a relationship between sensor position, bow position and stern position, and calculates the bow quay direction velocity, bow quay direction acceleration, stern quay direction velocity, and stern quay direction acceleration based on the bow speed, stern speed, and drift angle.

However, as illustrated in FIG. 3(B), the processing circuitry 50 can also calculate the quay direction velocity and quay direction acceleration at the position of the ship state detection sensor 31 based on the ship speed, ship acceleration, and drift angle, and can also calculate the bow quay direction velocity, bow quay direction acceleration, stern quay direction velocity, and stern quay direction acceleration based on the ship speed and ship acceleration as well as the relationship between sensor position, bow position and stern position.

(Bow Side Quay Distance and Stern Side Quay Distance)

The processing circuitry 50 calculates the bow position P91 (position coordinates) based on the ship position, and calculates a bow side quay distance based on the bow position P91 and the position coordinates of the quay line. The bow side quay distance is a distance between the bow position P91 and the foot of a perpendicular line dropped from the bow position P91 toward the quay line (quay line near the undocking and docking side). In other words, the bow side quay distance is a distance between the bow position P91 and a point on the quay line that is at a shortest distance from the bow position P91.

The processing circuitry 50 calculates the stern position P93*t* (position coordinates) based on the ship position, and calculates a stern side quay distance based on the stern position P93*t* and the position coordinates of the quay line. The stern side quay distance is a distance between the stern position P93*t* and the foot of a perpendicular line dropped from the stern position P93*t* toward the quay line (quay line near the undocking and docking side). In other words, the stern side quay distance is a distance between the stern position P93*t* and a point on the quay line that is at a shortest distance from the stern position P93*t*.

(Predicted Bow Arrival Time, Predicted Bow Arrival Speed, Predicted Stern Arrival Time, and Predicted Stern Arrival Speed)

The processing circuitry 50 calculates predicted bow arrival time or predicted bow arrival speed based on the bow quay direction velocity, bow quay direction acceleration, and bow side quay distance. The predicted bow arrival time is a predicted time from the present time until the bow position P91 reaches the quay line. The predicted bow arrival speed is a speed at the time when the bow position P91 reaches the quay line. The predicted bow arrival speed is a speed in a direction orthogonal to the quay line.

The processing circuitry 50 calculates predicted stern arrival time or predicted stern arrival speed based on the stern quay direction velocity, stern quay direction acceleration, and stern side quay distance. The predicted stern arrival time is a predicted time from the present time until the stern position P93*t* reaches the quay line. The predicted stern arrival speed is a speed at the time when the stern position P93*t* reaches the quay line. The predicted stern arrival speed is a speed in a direction orthogonal to the quay line.

(Predicted Positions at Equal Time Intervals)

Figure 4:
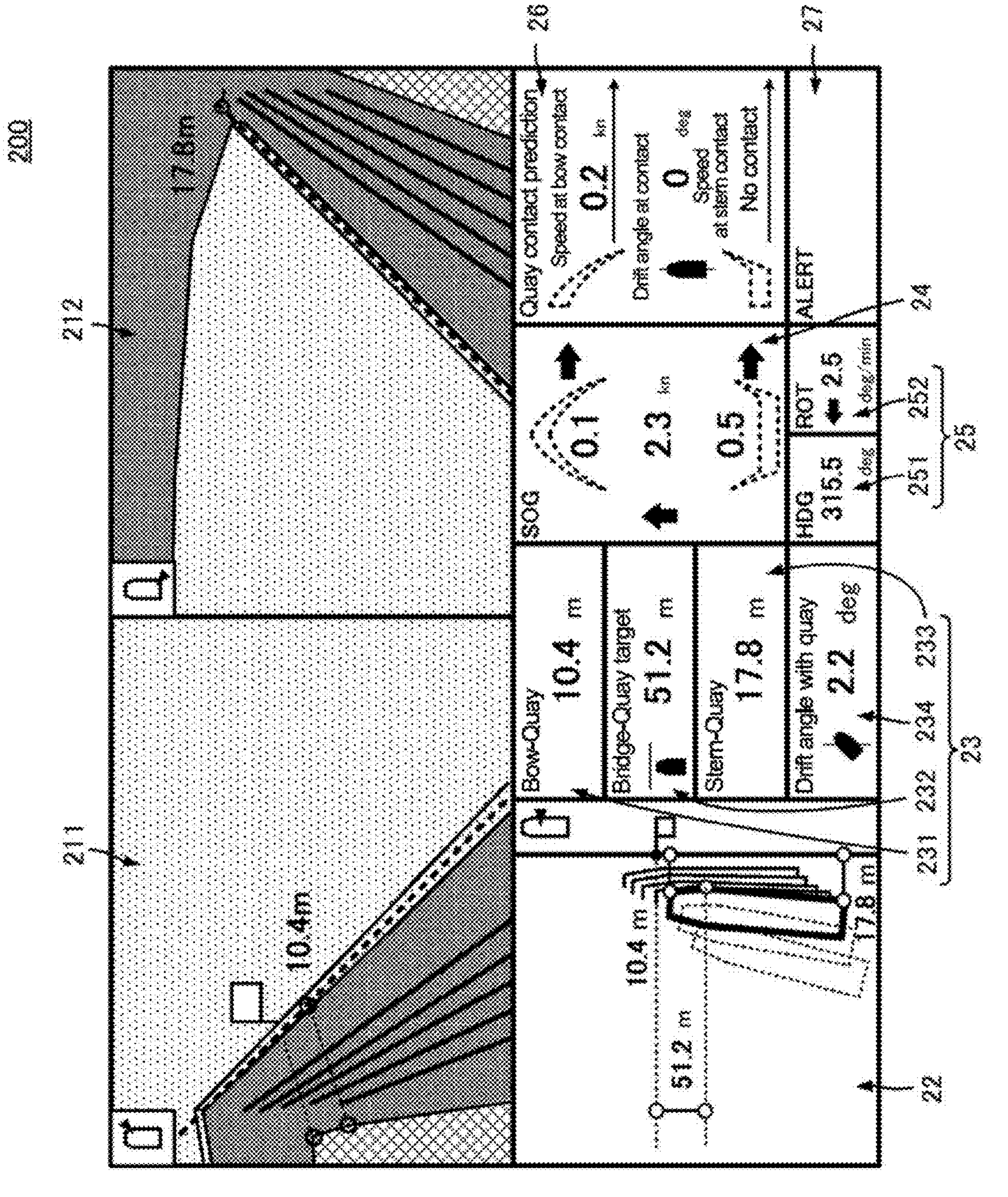
FIG. 4 illustrates one example of a display screen.

The processing circuitry 50 calculates predicted positions at equal time intervals based on the ship position, bow quay direction velocity, bow quay direction acceleration, stern quay direction velocity, and stern quay direction acceleration. The predicted positions at equal time intervals are positions of the undocking and docking side predicted at equal time intervals. The predicted positions at equal time intervals are represented by, for example, straight lines (line segments) simulating the undocking and docking side as illustrated in FIG. 4 and FIG. 5, and may also be represented by figures using two or more straight lines or curves simulating the undocking and docking side and the bow shape or stern shape.

(Bow Collision Prediction and Stern Collision Prediction)

The processing circuitry 50 generates bow collision prediction information based on the predicted bow arrival time or predicted bow arrival speed. The bow collision prediction information is information indicating that the bow position P91 reaches the quay at a particular speed or higher. In other words, collision with the quay is included in arrival at the quay; among the cases of arrival at the quay, the case where the quay is reached at the particular speed or higher is considered a collision.

The processing circuitry 50 generates stern collision prediction information based on the predicted stern arrival time or predicted stern arrival speed. The stern collision prediction information is information indicating that the stern position P93*t* reaches the quay at a particular speed or higher.

(Bow Azimuth at Arrival and Drift Angle at Arrival)

The processing circuitry 50 calculates bow azimuth at arrival based on the predicted bow arrival time, predicted stern arrival time, bow quay direction velocity, bow quay direction acceleration, stern quay direction velocity, and stern quay direction acceleration. The bow azimuth at arrival is the bow azimuth when the bow position P91 or the stern position P93*t* reaches the quay (quay line).

The processing circuitry 50 calculates a drift angle at arrival based on the bow azimuth at arrival and the quay line azimuth. The drift angle at arrival is an angle formed between the quay line and an axis extending in the bow stern direction of the ship 90 when the bow position P91 or the stern position P93*t* reaches the quay (quay line).

As illustrated in FIG. 3(C), the processing circuitry 50 can calculate the bow azimuth at arrival (=(bow azimuth)+(rate of turn)×(predicted arrival time)) based on the bow azimuth, rate of turn, and predicted arrival time, and can also calculate the drift angle at arrival based on the bow azimuth at arrival and the quay azimuth. The predicted arrival time is calculated based on the quay direction velocity, quay direction acceleration, and quay distance. The quay distance is calculated based on the ship position and the quay line.

The processing circuitry 50 outputs the above calculated or generated information to the image synthesizing unit 60. On this occasion, it is sufficient for the processing circuitry 50 to output, for example, the minimum necessary information for an image selected by an operator such as a captain or navigator.

(Image Synthesizing Unit 60 and Display 20)

The image synthesizing unit 60 generates display image data for navigation assistance based on imaging data (imaging data on the bow side of the undocking and docking side) from the camera 41, imaging data (imaging data on the stern side of the undocking and docking side) from the camera 42, and various data from the processing circuitry 50. The image synthesizing unit 60 generates the display image data in a preset update cycle and outputs the same to the display 20.

The display 20 displays the display image data on a display screen. The display 20 displays the display image data on the display screen while updating the display image data which is sequentially updated and input.

Example of Display Screen

FIG. 4 illustrates one example of a display screen. As illustrated in FIG. 4, a display screen 200 includes a bow side image window 211, a stern side image window 212, a bird's-eye view window 22, a numerical data display window 23, a ship speed display window 24, an azimuth relationship display window 25, an arrival prediction information display window 26, and a warning display window 27.

The bow side image window 211 and the stern side image window 212 are arranged side by side in a lateral direction in an upper section of the display screen 200. On this occasion, if the undocking and docking side is the starboard 93, the bow side image window 211 may be arranged on the left side, and the stern side image window 212 may be arranged on the right side. Accordingly, a positional relationship between the bow side image window 211 and the stern side image window 212 corresponds to a positional relationship between the actual bow 91 and the actual stern 92 of the ship 90. Accordingly, the navigation assistance device 10 can provide the operator with a display that matches the actual view from the ship 90 (bridge 99).

The bird's-eye view window 22, the numerical data display window 23, the ship speed display window 24, the azimuth relationship display window 25, the arrival prediction information display window 26, and the warning display window 27 are appropriately arranged side by side in a lower section of the display screen 200. On this occasion, the bird's-eye view window 22 may be displayed larger than the other windows. Although the details will be described later, the bird's-eye view window 22 displays a current position, a predicted track, and a past track of the ship 90. Accordingly, since the bird's-eye view window 22 is displayed large, the operator may easily and relatively clearly grasp the behavior of the ship 90.

(Bow Side Image Window and Stern Side Image Window)

The image synthesizing unit 60 stores in advance relationships in the absolute coordinate system, the ship body coordinate system, a coordinate system of an image of the camera 41, and a coordinate system of an image of the camera 42, and stores coordinate transformation matrices between each of them. In generating an image for the bow side image window 211 and the stern side image window 212, the image synthesizing unit 60 performs the calculation using a coordinate transformation in the case where the coordinate transformation is necessary.

Figure 5A:
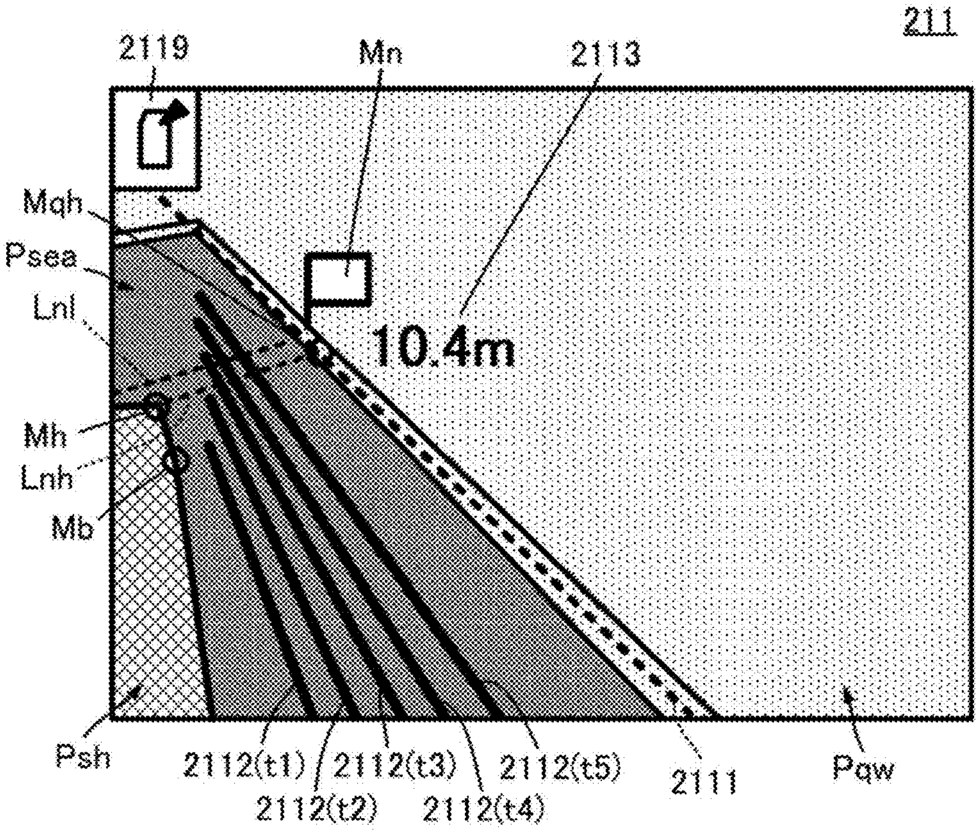
FIG. 5(A) illustrates one example of a bow side image window.
Figure 5B:
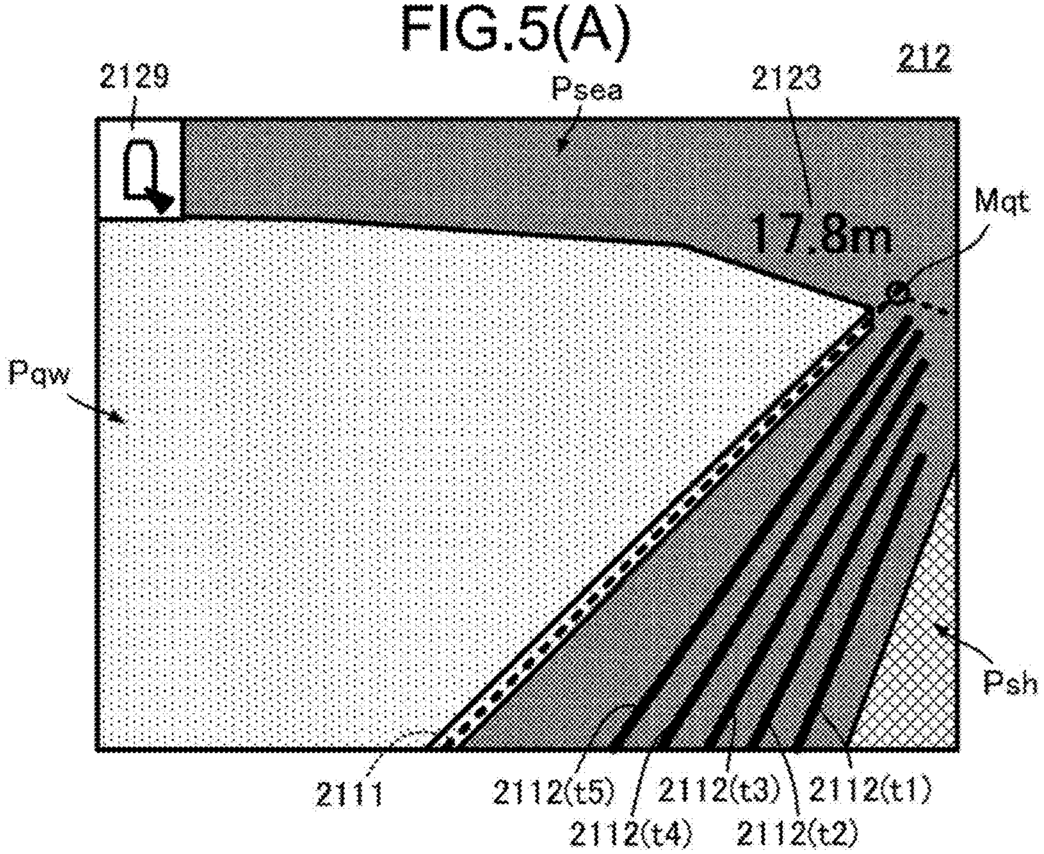
FIG. 5(B) illustrates one example of a stern side image window.

FIG. 5(A) illustrates one example of a bow side image window, and FIG. 5(B) illustrates one example of a stern side image window.

As illustrated in FIG. 5(A), the bow side image window 211 displays the imaging data (image) from the camera 41, and displays a ship image Psh, a sea surface image Psca, and a quay image Pqw. The bow side image window 211 displays a simplified image 2119 which indicates a position of an image. The simplified image 2119 includes a simplified plan view of the ship 90 and a mark indicating the position of the image, indicating that it is an image on the bow 91 side of the undocking and docking side.

The bow side image window 211 displays a quay line 2111, a docking reference point mark Mn, a bow position mark Mh, a bridge position mark Mb, a bow side foot position mark Mqh, and a docking reference point perpendicular line Lnl.

The quay line 2111 is a straight line. The quay line 2111 is generated based on the coordinates of the quay line detected by the processing circuitry 50.

The docking reference point mark Mn is generated based on a docking reference point (for example, the position of the N flag) in the absolute coordinate system.

The bow position mark Mh is generated based on the position coordinates of the bow position P91.

The bridge position mark Mb is generated based on the position coordinates of the bridge 99. More specifically, the bridge position mark Mb is generated based on the position coordinates of an end of the undocking and docking side of the bridge 99.

The bow side foot position mark Mqh is generated based on the position coordinates of the foot of the perpendicular line dropped from the bow position P91 to the quay line 2111.

The docking reference point perpendicular line Lnl is generated as a straight line that is orthogonal to the quay line 2111 from the docking reference point and extends in a direction of the sea side.

The bow side image window 211 displays a bow side quay distance 2113. The bow side quay distance 2113 is based on the bow side quay distance calculated by the processing circuitry 50 and is displayed as a numerical value. The bow side quay distance 2113 is displayed in the vicinity of the bow side foot position mark Mqh.

The bow side image window 211 displays multiple predicted positions 2112(*t*1) to 2112(*t*5). The multiple predicted positions 2112(*t*1) to 2112(*t*5) are straight lines simulating the undocking and docking side, and are each generated based on multiple predicted positions calculated at equal time intervals in the processing circuitry 50. In the present embodiment, an aspect is illustrated in which five predicted positions are generated and displayed. However, the number of predicted positions is not limited thereto as long as there are multiple predicted positions.

Specifically, the predicted position 2112(*t*1) is a straight line indicating the predicted position at a future time t1 from the present time; the predicted position 2112(*t*2) is a straight line indicating the predicted position at a time t2 subsequent to time t1. The predicted position 2112(*t*3) is a straight line indicating the predicted position at a time t3 subsequent to time t2; the predicted position 2112(*t*4) is a straight line indicating the predicted position at a time t4 subsequent to time t3; the predicted position 2112 (15) is a straight line indicating the predicted position at a time t5 subsequent to time t4.

A time difference between time t1 and time t2, a time difference between time t2 and time t3, a time difference between time t3 and time t4, and a time difference between time t4 and time t5 are the same. In other words, the multiple times t1 to t5 are at equal time intervals.

By displaying the bow side image window 211 like this, the operator can overlap the predicted positions of the undocking and docking side on the bow side of the ship 90 during a process of docking at the quay with an actual image for confirmation.

As illustrated in FIG. 5(B), in the stern side image window 212 displays the imaging data (image) from the camera 42, and displays the ship image Psh, the sea surface image Psca, and the quay image Pqw. The stern side image window 212 displays a simplified image 2129 which indicates a position of an image. The simplified image 2129 includes a simplified plan view of the ship 90 and a mark indicating the position of the image, indicating that it is an image on the stern 92 side of the undocking and docking side.

The stern side image window 212 displays the quay line 2111 and a stern side foot position mark Mqt. In the case where the docking reference point is on the stern 92 side of the bridge 99, the docking reference point mark Mn and the docking reference point perpendicular line Lnl are displayed in the stern side image window 212. In the case where the stern position P93*t* is included in the image, a stern position mark similar to the bow position mark Mh is displayed in the stern side image window 212.

The quay line 2111 is a straight line. The quay line 2111 is generated based on the coordinates of the quay line detected by the processing circuitry 50.

The stern side foot position mark Mqt is generated based on the position coordinates of the foot of the perpendicular line dropped from the stern position P93*t* to the quay line 2111.

The stern side image window 212 displays a stern side quay distance 2123. The stern side quay distance 2123 is based on the stern side quay distance calculated by the processing circuitry 50 and is displayed as a numerical value. The stern side quay distance 2123 is displayed in the vicinity of the stern side foot position mark Mqt.

Like the bow side image window 211, the stern side image window 212 displays multiple predicted positions 2112(*t*1) to 2112(*t*5).

By displaying the stern side image window 212 like this, the operator can overlap the predicted positions of the undocking and docking side on the stern side of the ship 90 during a process of docking at the quay with an actual image for confirmation.

By displaying the bow side image window 211 and the stern side image window 212 side by side, the operator can overlap the predicted positions of the undocking and docking side on both the bow side and the stern side during a process of docking at the quay with an actual image for confirmation.

The multiple predicted positions 2112(*t*1) to 2112(*t*5) are calculated based on the bow speed, bow acceleration, stern speed, and stern acceleration. Accordingly, the multiple predicted positions 2112(*t*1) to 2112 (15) are calculated considering not only the speed but also the acceleration. Accordingly, in the navigation assistance device 10, a position during docking can be relatively highly accurately predicted, and can be provided as navigation assistance information to the operator.

Furthermore, the multiple predicted positions 2112(*t*1) to 2112(*t*5) are calculated based on the bow quay direction velocity, bow quay direction acceleration, stern quay direction velocity, and stern quay direction acceleration. Accordingly, in the navigation assistance device 10, a state in which the multiple predicted positions 2112(*t*1) to 2112 (15) approach the quay can be relatively highly accurately calculated. Accordingly, in the navigation assistance device 10, a position during docking can be relatively highly accurately predicted, and can be provided as navigation assistance information to the operator.

Furthermore, the multiple predicted positions 2112(*t*1) to 2112 (15) are arranged at equal time intervals. Accordingly, a spacing between the lines indicating the multiple predicted positions 2112(*t*1) to 2112(*t*5) varies according to the acceleration (change in speed).

For example, if the acceleration is positive (accelerating), the spacing between adjacent predicted positions (prediction lines) is increased; if the acceleration is negative (decelerating), the spacing between adjacent predicted positions (prediction lines) is decreased. That is, a change in multiple predicted positions due to acceleration and deceleration during docking is clearly shown.

Furthermore, these predicted positions are affected by the bow quay direction acceleration on the bow side and by the stern quay direction acceleration on the stern side. Accordingly, an angular difference between adjacent predicted positions (prediction lines) is also clearly shown.

Accordingly, in the navigation assistance device 10, how the docking side behaves during docking under the influence of acceleration can be presented to the operator.

In the case where the ship 90 is a large ship, a distance from the bridge 99 to an area between the ship 90 and the quay is large, and the height is also different. Accordingly, it is difficult to easily confirm the behavior of the ship 90 during docking at a glance. However, by using the bow side image window 211 and the stern side image window 212, even for a large ship, in the navigation assistance device 10, how the docking side behaves during docking can be presented in a way that facilitates understanding by the operator.

In the present embodiment, an aspect is illustrated where the bow side image window 211 and the stern side image window 212 are displayed at the same time. However, it is possible to selectively display either the bow side image window 211 or the stern side image window 212.

(Bird's-Eye View Window)

Figure 6:
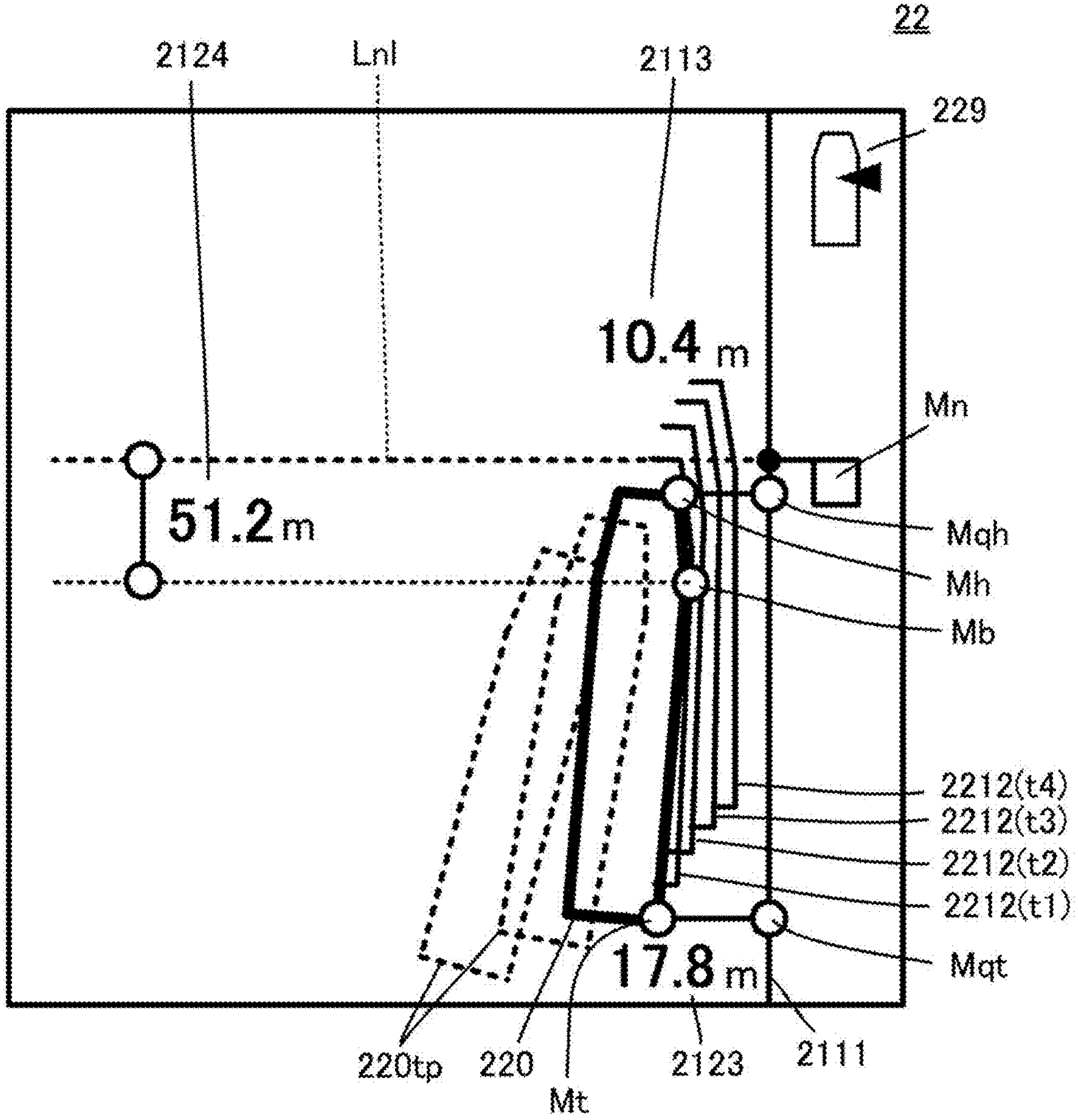
FIG. 6 illustrates one example of a bird's-eye view window.

FIG. 6 illustrates one example of a bird's-eye view window.

As illustrated in FIG. 6, the bird's-eye view window 22 expresses a docking state of the ship 90 as viewed from above (plan view) using an image of marks and the like. The bird's-eye view window 22 displays the quay line 2111, the docking reference point mark Mn, the bow position mark Mh, the bridge position mark Mb, a stern position mark Mt, the bow side foot position mark Mqh, the stern side foot position mark Mqt, and the docking reference point perpendicular line Lnl.

As in the bow side image window 211 and the stern side image window 212, the quay line 2111 is a straight line, extending longitudinally in the bird's-eye view window 22, and is arranged near the right edge of the bird's-eye view window 22. The quay line 2111 may be arranged at the right edge in the case where the docking side of the ship 90 is the starboard 93, and may be arranged at the left edge in the case where the docking side of the ship 90 is the port 94.

The docking reference point mark Mn, bow position mark Mh, bridge position mark Mb, and bow side foot position mark Mqh are similar to those in the bow side image window 211 and the stern side image window 212.

The stern position mark Mt is generated based on the position coordinates of the stern position P93*t* of the docking side.

The bow side foot position mark Mqh is generated based on the position coordinates of the foot of the perpendicular line dropped from the stern position P91*t* to the quay line 2111.

The bird's-eye view window 22 displays the bow side quay distance 2113 and the stern side quay distance 2123. The bow side quay distance 2113 is based on the bow side quay distance calculated by the processing circuitry 50 and is displayed as a numerical value. The stern side quay distance 2123 is based on the stern side quay distance calculated by the processing circuitry 50 and is displayed as a numerical value.

The bird's-eye view window 22 displays a bridge quay reference point distance 2124. The bridge quay reference point distance 2124 is a distance between a bridge position and a quay reference point (position of the docking reference point mark Mn) in a direction parallel to the quay line 2111, and is displayed as a numerical value.

The bird's-eye view window 22 displays a current state mark 220, multiple predicted track marks 2212(*t*1) to 2212(*t*4), and multiple past track marks 220*tp*.

The current state mark 220 is a mark obtained by simplifying the shape of the ship 90 in a bird's-eye view. The bow position mark Mh, bridge position mark Mb, and stern position mark Mt are arranged on the current state mark 220. The current state mark 220 is displayed based on the ship position (bow position, stern position) and bow azimuth.

The multiple predicted track marks 2212(*t*1) to 2212(*t*4) are marks obtained by simplifying a portion of the docking side, the bow, and the stern. It is sufficient that the multiple predicted track marks 2212(*t*1) to 2212(*t*4) include at least a straight line schematically representing the docking side.

Like the multiple predicted positions 2112(*t*1) to 2112(*t*5), the multiple predicted track marks 2212(*t*1) to 2212(*t*4) are generated based on multiple predicted positions calculated at equal time intervals in the processing circuitry 50.

The multiple past track marks 220*tp* are displayed based on the ship position (bow position, stern position) and bow azimuth in the past.

By generating and displaying the multiple predicted track marks 2212(*t*1) to 2212(*t*4) in a similar manner to the multiple predicted positions 2112(*t*1) to 2112(*t*5), in the navigation assistance device 10, how the docking side behaves during docking can be highly accurately presented even using the bird's-eye view window 22, and can be presented in a way that facilitates understanding by the operator.

(Numerical Data Display Window)

Figure 7:
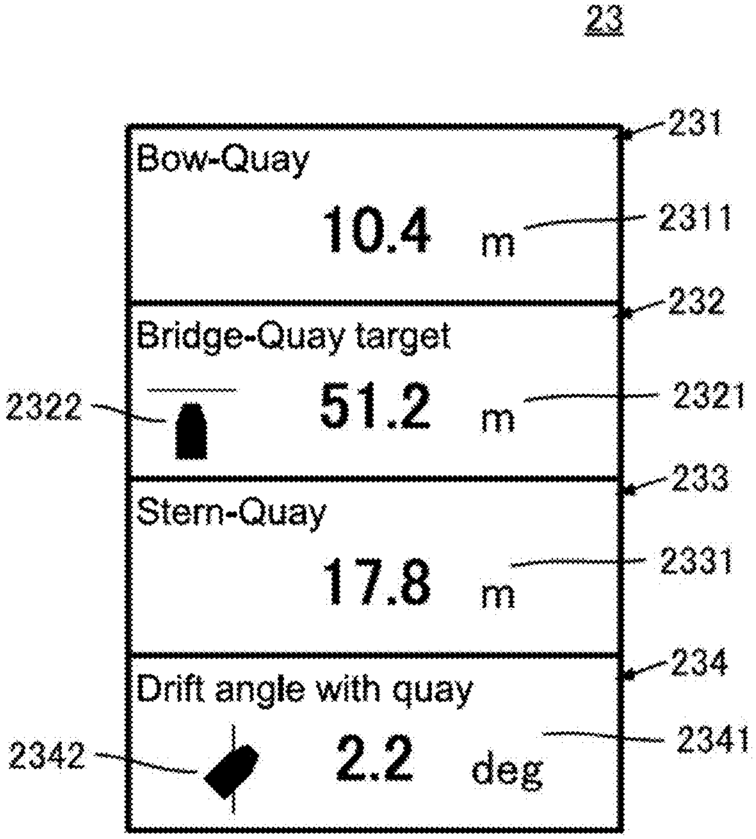
FIG. 7 illustrates one example of a numerical data display window.

FIG. 7 illustrates one example of a numerical data display window.

The numerical data display window 23 includes a bow side quay distance display window 231, a bridge quay reference point distance display window 232, a stern side quay distance display window 233, and a drift angle display window 234.

In the bow side quay distance display window 231, the bow side quay distance 2311 is displayed as a numerical value.

In the bridge quay reference point distance display window 232, a bridge quay reference point distance 2321 is displayed as a numerical value, and a mark 2322 is displayed which indicates a positional relationship between the ship 90 and the docking reference point perpendicular line Lnl.

In the stern side quay distance display window 233, a stern side quay distance 2331 is displayed as a numerical value.

In the drift angle display window 234, a drift angle 2341 of the ship 90 relative to the quay line 2111 is displayed as a numerical value, and a relationship 2342 between the quay line 2111 and the bow azimuth is displayed as a mark.

Through these displays, in the navigation assistance device 10, the docking state of the ship 90 can be provided in numerical values to the operator, and a relationship between the ship and the quay can be supplementarily provided using marks to the operator.

(Ship Speed Display Window)

Figure 8:
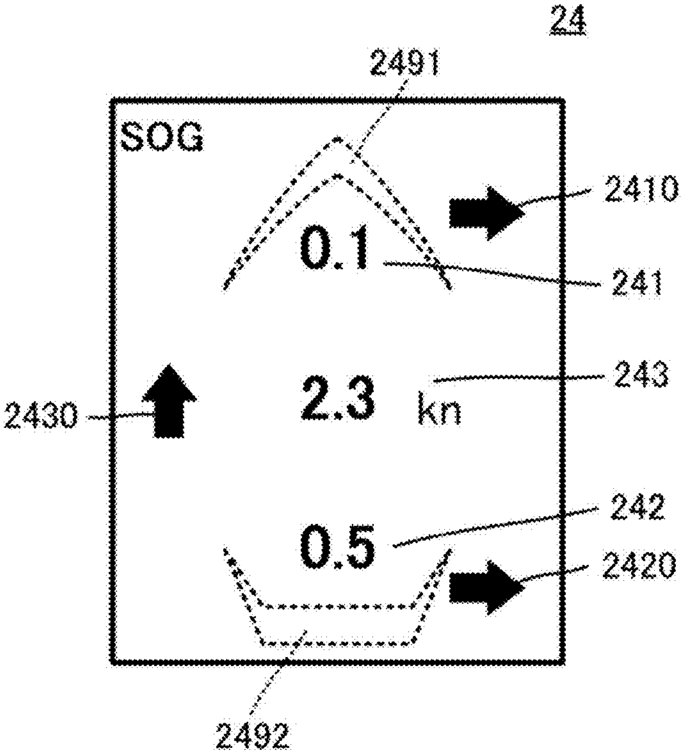
FIG. 8 illustrates one example of a ship speed display window.

FIG. 8 illustrates one example of a ship speed display window.

The ship speed display window 24 displays a bow mode mark 2491 and a stern mode mark 2492. The bow mode mark 2491 and the stern mode mark 2492 are arranged side by side in a longitudinal direction of the ship speed display window 24.

In the ship speed display window 24, a bow quay direction velocity 241 is displayed as a numerical value, a stern quay direction velocity 242 is displayed as a numerical value, a bow stern direction velocity 243 is displayed as a numerical value, and a direction mark 2410 for the bow quay direction velocity, a direction mark 2420 for the stern quay direction velocity, and a direction mark 2430 for the bow stern direction velocity are displayed.

The bow quay direction velocity 241 and the direction mark 2410 for the bow quay direction velocity are arranged in the vicinity of the bow mode mark 2491. The stern quay direction velocity 242 and the direction mark 2420 for the stern quay direction velocity are arranged in the vicinity of the stern mode mark 2492. The bow stern direction velocity 243 and the direction mark 2430 for the bow stern direction velocity are arranged between the bow mode mark 2491 and the stern mode mark 2492 in the longitudinal direction of the ship speed display window 24.

The numerical value of the bow quay direction velocity 241 and the direction mark 2410 for the bow quay direction velocity are displayed based on the bow quay direction velocity calculated by the processing circuitry 50. The direction mark 2410 for the bow quay direction velocity is displayed as an arrow mark pointing in a movement direction of the bow position P91.

The numerical value of the stern quay direction velocity 242 and the direction mark 2420 for the stern quay direction velocity are displayed based on the stern quay direction velocity calculated by the processing circuitry 50. The direction mark 2420 for the stern quay direction velocity is displayed as an arrow mark pointing in a movement direction of the stern position P93*t*.

The numerical value of the bow stern direction velocity 243 and the direction mark 2430 for the bow stern direction velocity are calculated by the processing circuitry 50 based on the ship speed and bow azimuth, and are displayed based on a result of the calculation. The direction mark 2430 for the bow stern direction velocity is displayed as an arrow mark pointing in a movement direction of the ship 90 in the bow stern direction.

By performing such display, in the navigation assistance device 10, docking behavior of the bow 91 and docking behavior of the stern 92 can be presented through numerical values and arrow marks in a way that facilitates understanding by the operator.

(Azimuth Relationship Display Window)

The azimuth relationship display window 25 includes an azimuth display window 251 and a rate of turn display window 252. The azimuth display window 251 displays a ship azimuth as a numerical value. The rate of turn display window 252 displays a rate of turn as a numerical value.

(Arrival Prediction Information Display Window)

Figure 9:
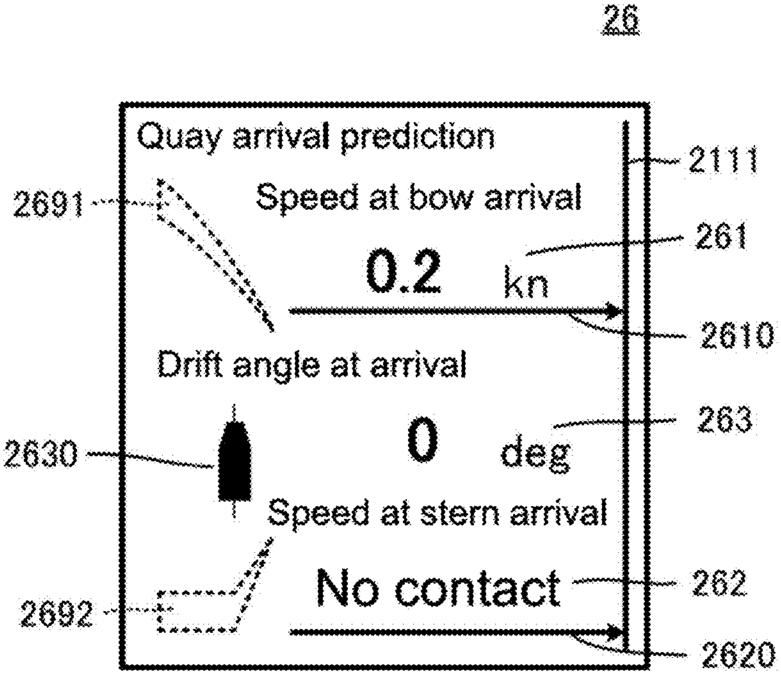
FIG. 9 illustrates one example of an arrival prediction information display window.

FIG. 9 illustrates one example of an arrival prediction information display window.

The arrival prediction information display window 26 displays a bow mode mark 2691 and a stern mode mark 2692. The bow mode mark 2691 and the stern mode mark 2692 are arranged side by side in a longitudinal direction of the arrival prediction information display window 26. The bow mode mark 2691 and the stern mode mark 2692 are displayed in a shape of a half of the docking side of the ship 90.

In the arrival prediction information display window 26, bow arrival speed 261 is displayed as a numerical value, stern arrival speed 262 is displayed as a numerical value, drift angle at arrival 263 is displayed as a numerical value, bow arrival direction 2610 is displayed as an arrow, stern arrival direction 2620 is displayed as an arrow, and a mark 2630 is displayed which schematically represents a drift angle at arrival.

The bow arrival speed 261 and the bow arrival direction 2610 are arranged in the vicinity of the bow mode mark 2691. The stern arrival speed 262 and the stern arrival direction 2620 are arranged in the vicinity of the stern mode mark 2692. The drift angle at arrival 263 and the mark 2630 that schematically represents the drift angle at arrival are arranged between the bow mode mark 2691 and the stern mode mark 2692 in the longitudinal direction of the arrival prediction information display window 26.

The numerical value of the bow arrival speed 261 and the arrow of the bow arrival direction 2610 are displayed based on a predicted bow arrival speed and the bow collision prediction information calculated by the processing circuitry 50. The numerical value of the stern arrival speed 262 and the arrow of the stern arrival direction 2620 are displayed based on the predicted stern arrival speed and the stern collision prediction information calculated by the processing circuitry 50.

For the numerical value of the bow arrival speed 261 and the numerical value of the stern arrival speed 262, the predicted arrival speed of whichever of the bow position P91 and the stern position P93*t* reaches the quay first is displayed. For the one that has not reached the quay at this point, for example, the text "no contact (no arrival)," is displayed, as illustrated in FIG. 9. The arrow of the bow arrival direction 2610 and the arrow of the stern arrival direction 2620 are displayed based on a direction of arrival. For the bow or stern that has not reached the quay at this point, for example, a simple straight line, may be displayed.

The numerical value of the drift angle at arrival 263 and the mark 2630 that schematically represents the drift angle at arrival are displayed based on the drift angle at arrival calculated by the processing circuitry 50. On this occasion, the mark 2630 is displayed based on a direction of the drift angle.

By performing such display, in the navigation assistance device 10, a predicted speed and a predicted drift angle when the ship 90 is docked can be presented through numerical values and various marks in a way that facilitates understanding by the operator.

(Warning Display Window)

The warning display window 27 displays a system alert or the like.

By performing such display, in the navigation assistance device 10, information that can assist in navigation (maneuvering assistance) during docking of the ship 90 can be provided collectively on a single screen in a way that facilitates understanding by the operator.

In particular, in the navigation assistance device 10, the predicted track of the ship 90 is calculated using the quay direction velocity and quay direction acceleration of the bow side as well as the quay direction velocity and quay direction acceleration of the stern side, and is displayed. Accordingly, in the navigation assistance device 10, a predicted track that highly accurately reflects the actual behavior of the ship 90 can be provided to the operator. Furthermore, since the predicted track is displayed at equal time intervals, in the navigation assistance device 10, the actual behavior of the ship 90 taking into account acceleration can be presented in a way that facilitates understanding by the operator.

Furthermore, in the case of a large ship, it is difficult to control a sudden increase and decrease in ship speed, and different controls are required for the bow and the stern. In a large ship, depending on the arrival speed and arrival attitude at the quay, the inertial force due to the weight of the ship or the like may cause significant damage to the ship body. However, in the navigation assistance device 10, a predicted track taking into account the acceleration of both the bow and stern can be highly accurately presented, assistance for highly accurate speed control and attitude control can be realized, and assistance can be provided for safe docking.

(Another Aspect of Display Windows)

The navigation assistance device 10 may also display the following display windows separately from the various display windows described above.

(Quay Arrival Prediction Display Window)

Figure 10:
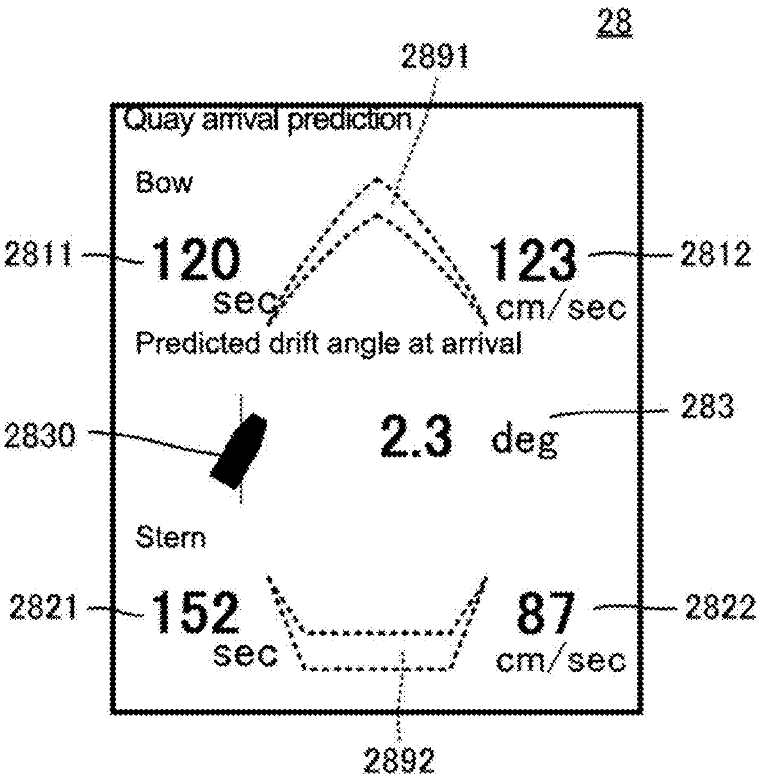
FIG. 10 illustrates one example of a quay arrival prediction display window.

FIG. 10 illustrates one example of a quay arrival prediction display window.

The quay arrival prediction display window 28 displays a bow mode mark 2891 and a stern mode mark 2892. The bow mode mark 2891 and the stern mode mark 2892 are arranged side by side in a longitudinal direction of the quay arrival prediction display window 28.

In the quay arrival prediction display window 28, bow quay arrival time 2811 is displayed as a numerical value, bow quay direction velocity 2812 of the bow at arrival at the quay is displayed as a numerical value, stern quay arrival time 2821 is displayed as a numerical value, and the stern quay direction velocity 2822 of the stern at arrival at the quay is displayed as a numerical value. In the quay arrival prediction display window 28, a predicted drift angle 283 at arrival at the quay is displayed as a numerical value, and a mark 2830 is displayed which schematically represents a predicted drift angle at arrival at the quay.

The bow quay arrival time 2811 and the bow quay direction velocity 2812 are arranged in the vicinity of the bow mode mark 2891. The stern quay arrival time 2821 and the stern quay direction velocity 2822 are arranged in the vicinity of the stern mode mark 2892. The predicted drift angle 283 at arrival at the quay and the mark 2830 that schematically represents the predicted drift angle at arrival at the quay are arranged between the bow mode mark 2891 and the stern mode mark 2692 in the longitudinal direction of the quay arrival prediction display window 28.

The bow quay arrival time 2811 and the bow quay direction velocity 2812 are displayed based on the predicted bow arrival time and the predicted bow arrival speed calculated by the processing circuitry 50. The stern quay arrival time 2821 and the stern quay direction velocity 2822 are displayed based on the predicted stern arrival time and the predicted stern arrival speed calculated by the processing circuitry 50. The predicted drift angle 283 at arrival at the quay and the mark 2830 that schematically represents the predicted drift angle at arrival at the quay are displayed based on the drift angle at arrival calculated by the processing circuitry 50.

By performing such display, in the navigation assistance device 10, the predicted arrival time, predicted arrival speed, and predicted drift angle when the ship 90 is docked can be presented through numerical values and various marks in a way that facilitates understanding by the operator.

(Another Aspect of Bow Side Image Window)

Figure 11:
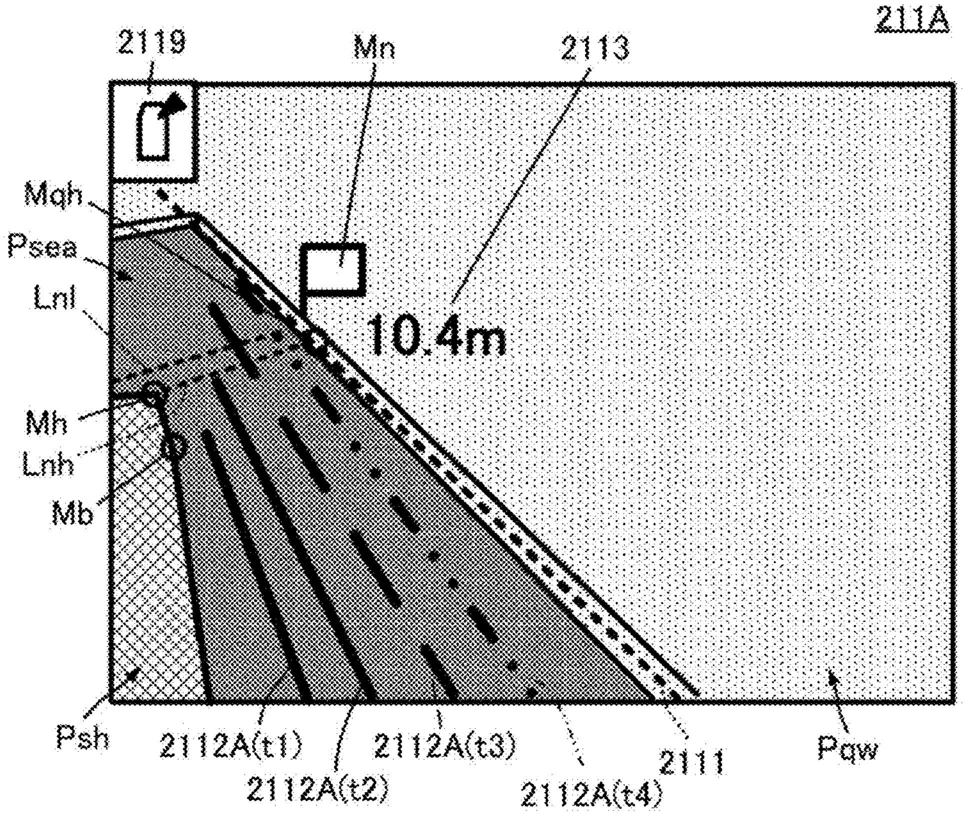
FIG. 11 illustrates another example of the bow side image window.

FIG. 11 illustrates another example of the bow side image window. As illustrated in FIG. 11, a bow side image window 211A differs from the bow side image window 211 in multiple predicted positions 2112A(t1), 2112A(t2), 2112A(t3), and 2112A(t4). Other configurations of the bow side image window 211A are similar to those of the bow side image window 211, and the descriptions of similar portions are omitted.

Multiple predicted positions 2112A(t1) to 2112A(t4) change their display mode according to a collision risk level with the quay. Examples of changes in display mode include change in display color, change in display brightness, blinking, and types of display lines. For instance, in the case of display color, the display color may change to a blue-based color if the risk level is low, and may change to a red-based color if the risk level is high.

Specifically, a display mode setting unit (processing circuitry 50 or image synthesizing unit 60) sets an upper limit quay direction velocity (upper limit speed) according to a distance between a predicted position and the quay. The processing circuitry 50 or the image synthesizing unit 60 makes the display mode of each predicted position differ between cases where the speed is higher or lower than this upper limit speed.

As one example, if the distance between the predicted position and the quay is from 200 m to 100 m, the upper limit speed is set to 1 kn; if from 100 m to 60 m, the upper limit speed is set to 30 cm/sec; if from 60 m to 30 m, the upper limit speed is set to 15 cm/sec; and if less than 30 m, the upper limit speed is set to 10 cm/sec. However, this is just one example, and the upper limit speed may be appropriately set according to, for example, a state (shape, weight) of the ship 90, tidal currents, wind direction and speed.

Alternatively, the processing circuitry 50 or the image synthesizing unit 60 may set multiple risk levels for each distance and change the display mode of the predicted position for each of the multiple risk levels. In this case, for example, if display color is used, the display color may change to a red-based color as the risk level increases, and may change to a blue-based color as the risk level decreases.

For example, in the case of FIG. 11, the risk level is low at multiple predicted positions 2112A(t1) and 2112A(t2), and the risk level increases at the predicted position 2112A(t3), and further increases at the predicted position 2112A(t4). Hence, the processing circuitry 50 or the image synthesizing unit 60 makes the display mode differ between the predicted positions 2112A(t1) and 2112A(t2), the predicted position 2112A(t3), and the predicted position 2112A(t4).

While the bow side image window is illustrated here as an example, the same applies to the stern side image window.

By such a configuration, in the navigation assistance device 10, a docking speed and a collision risk level with the quay can be presented in a visually easy-to-understand manner. On the other hand, in the navigation assistance device 10, a state in which the docking speed is excessively slow can also be presented in a visually easy-to-understand manner.

(Another Aspect of Bird's-eye View Window)

Figure 12:
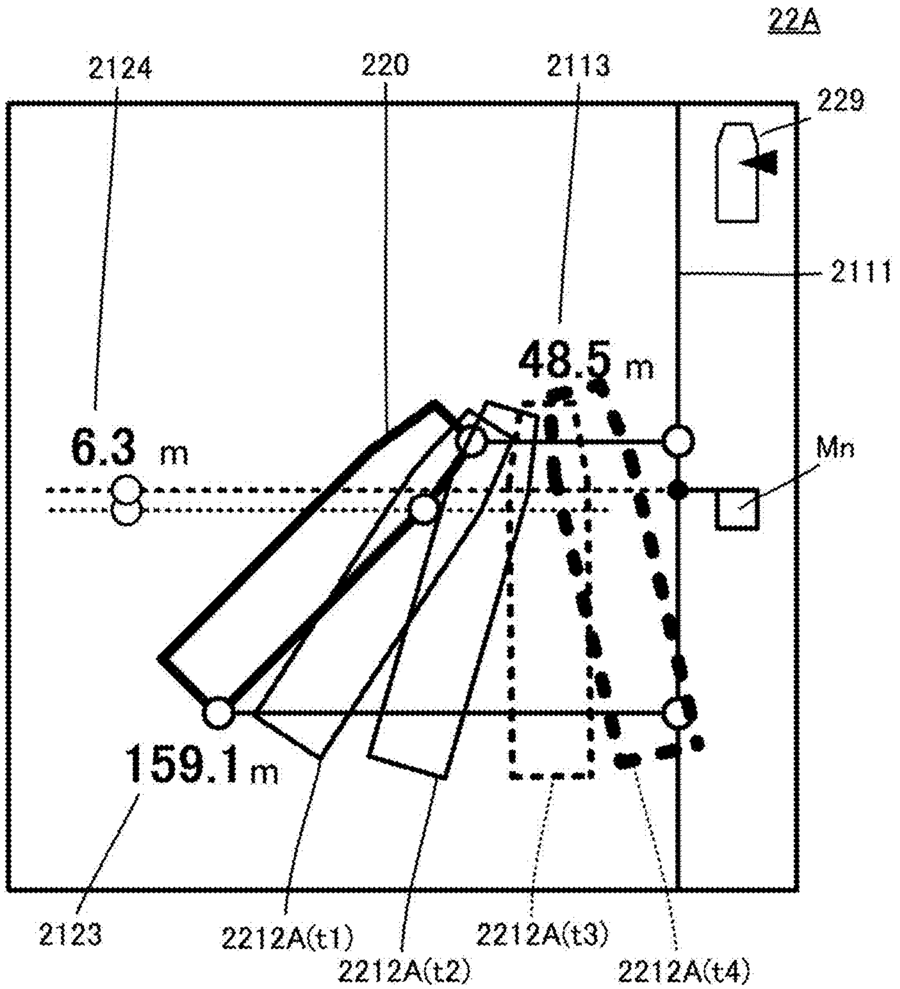
FIG. 12 illustrates another example of the bird's-eye view window.

FIG. 12 illustrates another example of the bird's-eye view window. As illustrated in FIG. 12, a bird's-eye view window 22A differs from the bird's-eye view window 22 in multiple predicted positions 2212A(t1), 2212A(t2), 2212A(t3), and 2212A(t4). Other configurations of the bird's-eye view window 22A are similar to those of the bird's-eye view window 22, and the descriptions of similar portions are omitted.

Multiple predicted positions 2212A(t1) to 2212A(t4) change their display mode according to a collision risk level with the quay. Examples of changes in display mode include change in display color, change in display brightness, blinking, and types of display lines. For instance, in the case of display color, the display color may change to a blue-based color if the risk level is low, and may change to a red-based color if the risk level is high.

Specifically, the processing circuitry 50 or the image synthesizing unit 60 sets the risk level based on the likelihood of either the bow or the stern colliding with the quay at a particular speed or higher, according to the distance between the predicted position and the quay. The processing circuitry 50 or the image synthesizing unit 60 makes the display mode of each predicted position differ based on this risk level.

For example, in the case of FIG. 12, the risk level is low at multiple predicted positions 2212A(t1) and 2212A(t2), and the risk level increases at the predicted position 2212A (t3), and further increases at the predicted position 2212A (t4). Hence, the processing circuitry 50 or the image synthesizing unit 60 makes the display mode differ between the predicted positions 2212A(t1) and 2212A(t2), the predicted position 2212A(t3), and the predicted position 2212A(t4).

By such a configuration, in the navigation assistance device 10, a docking speed and a collision risk level with the quay can be presented in a visually easy-to-understand manner. On the other hand, as illustrated in FIG. 12, in the navigation assistance device 10, a state in which the turning angle is not sufficient during docking while turning, or the like, can be presented in a visually easy-to-understand manner.

(Another Aspect of Ship Speed Display Window)

Figure 13:
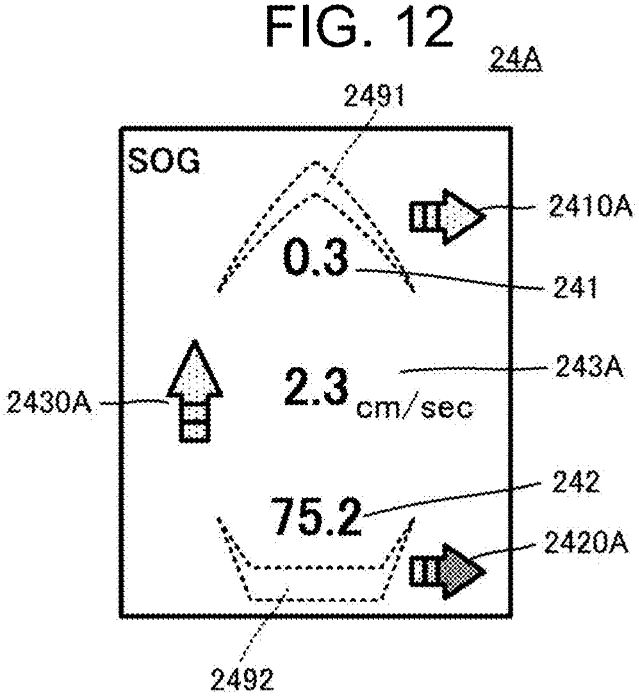
FIG. 13 illustrates another example of the ship speed display window.

FIG. 13 illustrates another example of the ship speed display window. As illustrated in FIG. 13, a ship speed display window 24A differs from the ship speed display window 24 in a direction mark 2410A for the bow quay direction velocity, a direction mark 2420A for the stern quay direction velocity, and a direction mark 2430A for the bow stern direction velocity. Other configurations of the ship speed display window 24A are similar to those of the ship speed display window 24, and the descriptions of similar portions are omitted.

The direction mark 2410A for the bow quay direction velocity, the direction mark 2420A for the stern quay direction velocity, and the direction mark 2430A for the bow stern direction velocity change their display mode according to a risk level for each range of a predicted position.

The direction mark 2410A for the bow quay direction velocity, the direction mark 2420A for the stern quay direction velocity, and the direction mark 2430A for the bow stern direction velocity are divided into multiple sections between the tip and the base of the arrow. Each arrow is set such that the closer to the base of the arrow, the closer to the present time, and the closer to the tip of the arrow, the earlier the predicted time becomes.

Like the multiple predicted positions in the bow side image window, the stern side image window, and the bird's-eye view window, the direction mark 2410A for the bow quay direction velocity, the direction mark 2420A for the stern quay direction velocity, and the direction mark 2430A for the bow stern direction velocity change their display mode for each section according to the risk level.

Accordingly, in the navigation assistance device 10, a collision risk level of the bow or stern with the quay can be visually presented using the direction mark 2410A for the bow quay direction velocity and the direction mark 2420A for the stern quay direction velocity. Furthermore, in the navigation assistance device 10, whether the bridge 99 is approaching the docking reference point can be visually presented by using the direction mark 2430A for the bow stern direction velocity.

In the above description, an aspect is illustrated in which multiple predicted positions are generated and displayed at equal time intervals. However, it is also possible to change the time interval according to a distance to the quay. For example, as the distance to the quay is shortened, the time interval is shortened. Accordingly, in the navigation assistance device 10, a more detailed predicted position can be provided as the distance up to the point of docking is shortened.

Furthermore, for example, multiple sections can be set according to the distance (distance in a direction orthogonal to the quay) to the quay. The time interval is changed for each section, and the time interval is constant within each section. Accordingly, in the navigation assistance device 10, the shorter the distance up to the point of docking in the section, the more detailed predicted position can be provided. Moreover, the effects of acceleration can be displayed in an easy-to-understand manner within each section.

(Navigation Assistance Method)

Figure 14B:
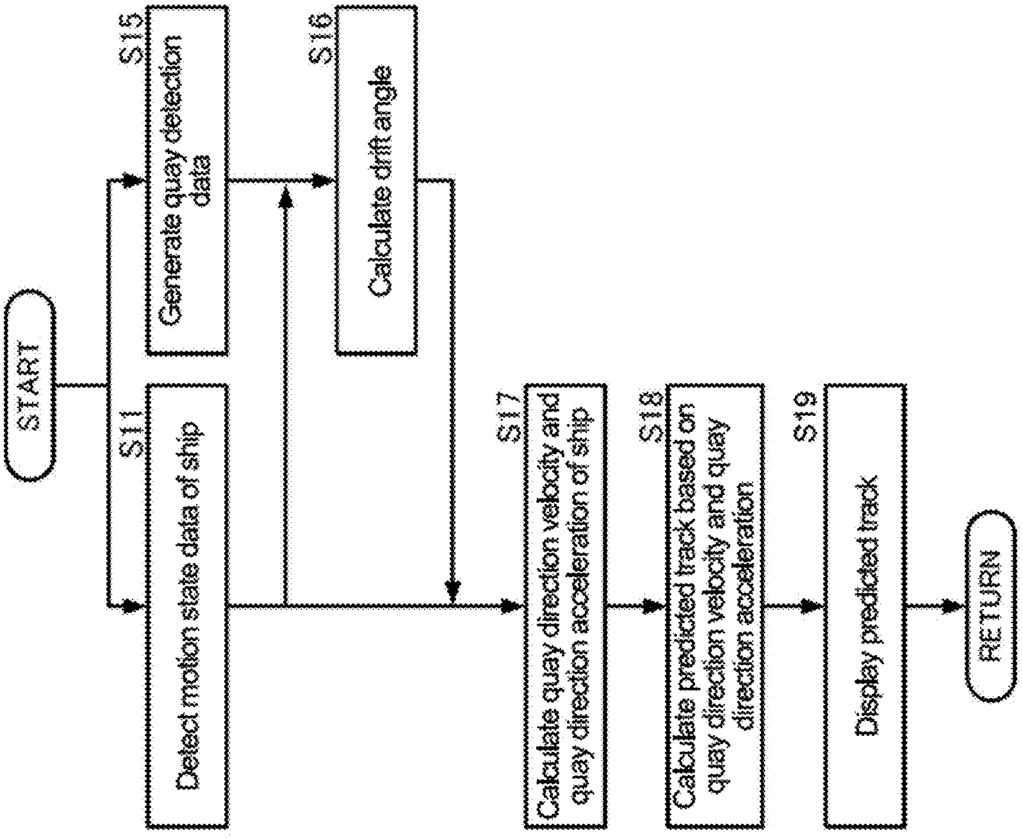
FIG. 14(A) and FIG. 14(B) are flowcharts illustrating one example of a method for displaying a predicted position in a navigation assistance method according to the present embodiment.
Figure 14A:
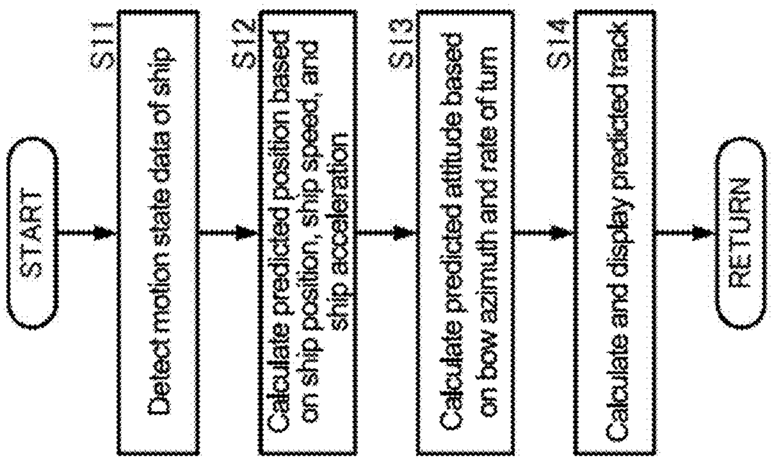

In the navigation assistance device 10, navigation assistance information is generally generated by the following method. FIG. 14(A) and FIG. 14(B) are flowcharts illustrating one example of a method for displaying a predicted position in a navigation assistance method according to the present embodiment. Since the specific content of each processing is described above or below, the description here will be omitted as appropriate.

First Example

As illustrated in FIG. 14(A), in the navigation assistance device 10, motion state data of the ship 90 is detected using the ship state detection sensor 31 (S11).

In the navigation assistance device 10, a predicted position is calculated in the processing circuitry 50 based on the ship position, ship speed, and ship acceleration in the motion state data (S12).

In the navigation assistance device 10, a predicted attitude is calculated in the processing circuitry 50 based on the bow azimuth and rate of turn in the motion state data (S13).

In the navigation assistance device 10, a predicted track is calculated in the processing circuitry 50 based on the predicted position and predicted attitude and is displayed (S14). The predicted track is represented by a figure such as a line simulating the docking side of the ship 90.

It is sufficient for the predicted track to include at least a predicted position. That is, for example, in the case where the ship 90 is not turning, a highly accurate predicted track can be calculated using only a predicted position.

Second Example

As illustrated in FIG. 14(B), in the navigation assistance device 10, motion state data of the ship 90 is detected using the ship state detection sensor 31 (S11). In the navigation assistance device 10, quay detection data is generated by the quay detection sensor 32 (S15).

In the navigation assistance device 10, a drift angle between the ship 90 and the quay line is calculated in the processing circuitry 50 using the bow azimuth from the motion state data and the coordinates or azimuth of the quay line from the quay detection data (S16).

In the navigation assistance device 10, quay direction velocity and quay direction acceleration of the ship 90 are calculated in the processing circuitry 50 (S17).

In the navigation assistance device 10, a predicted track of the ship 90 during docking is calculated in the processing circuitry 50 based on quay direction velocity and quay direction acceleration (S18). The predicted track is represented by a figure such as a line simulating the docking side of the ship 90.

In the navigation assistance device 10, the predicted track is displayed on the display 20 by the image synthesizing unit 60 (S19).

In the navigation assistance device 10, while the processing described above is repeated, the predicted position is updated and is displayed on the display 20.

(Specific Configuration and Processing of Operation Unit)

Figure 20:
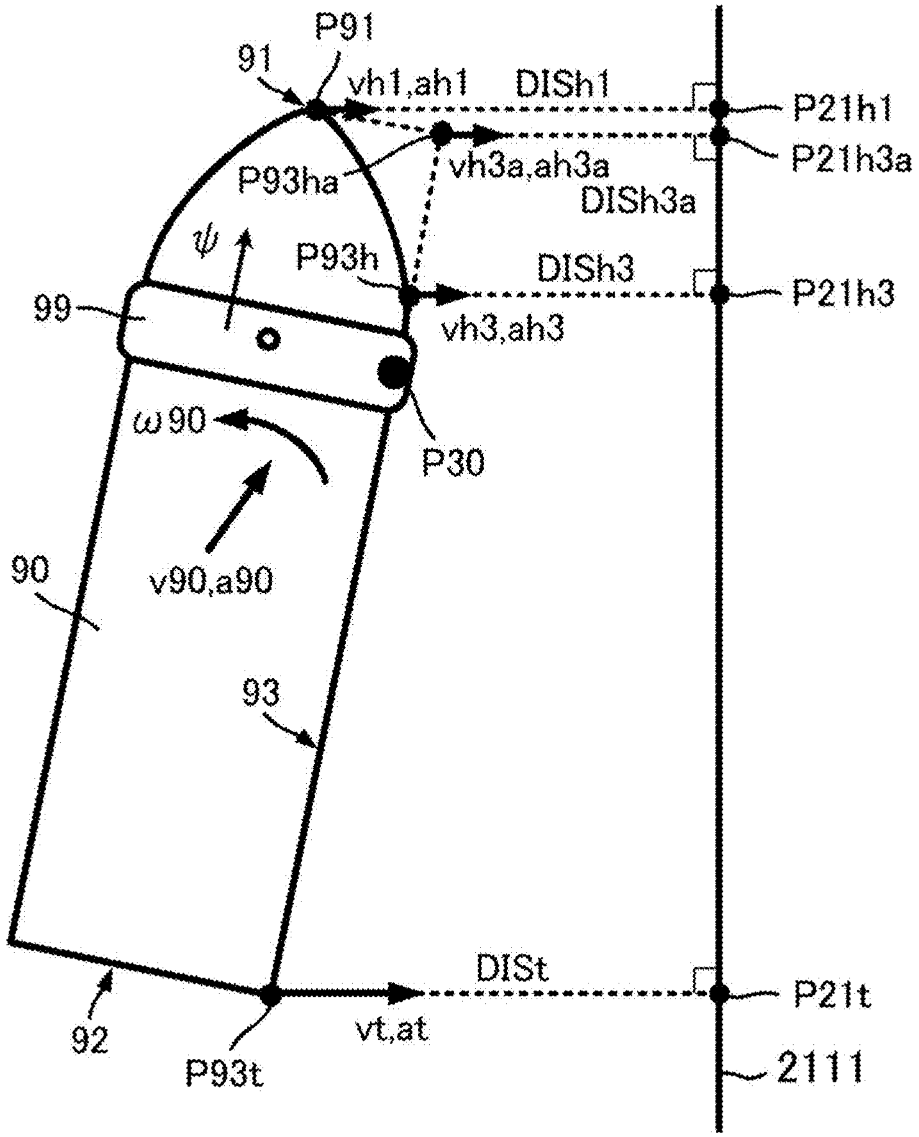
FIG. 20 is a diagram for describing definitions and calculation concepts of quay direction velocity and quay direction distance.
Figure 21A:
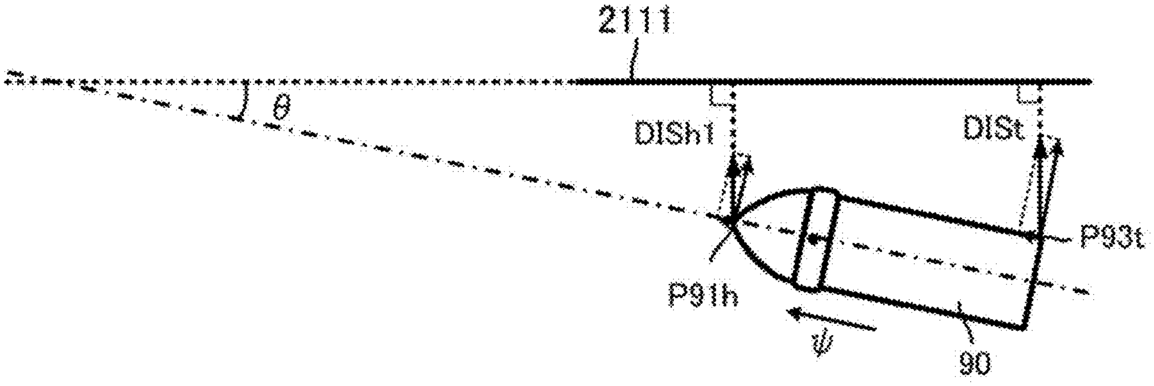
FIG. 21(A) and FIG. 21(B) are diagrams for describing a definition of drift angle and a calculation concept of quay direction velocity.
Figure 21B:
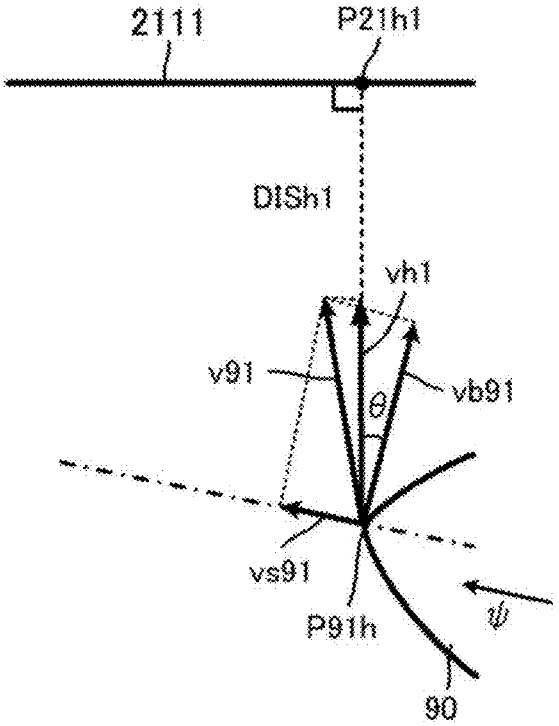

To realize the various displays described above, the processing circuitry 50 includes, for example, the following configuration. FIG. 15, FIG. 16, FIG. 17(A), FIG. 17(B), FIG. 18, FIG. 19(A) and FIG. 19(B) are functional block diagrams of the processing circuitry of the navigation assistance device according to an embodiment of the disclosure. FIG. 20 is a diagram for describing definitions and calculation concepts of quay direction velocity and quay direction distance. FIG. 21(A) and FIG. 21(B) are diagrams for describing a definition of drift angle and a calculation concept of quay direction velocity. In the following, the bow position P91 is described as an example. However, similar configuration and processing can be implemented in the case of using the bow position P93*h* (an end on the bow 91 side of the starboard 93 that is undocked and docked).

(Calculation System for Drift Angle, Quay Direction Velocity, and Quay Direction Acceleration)

Figure 15:
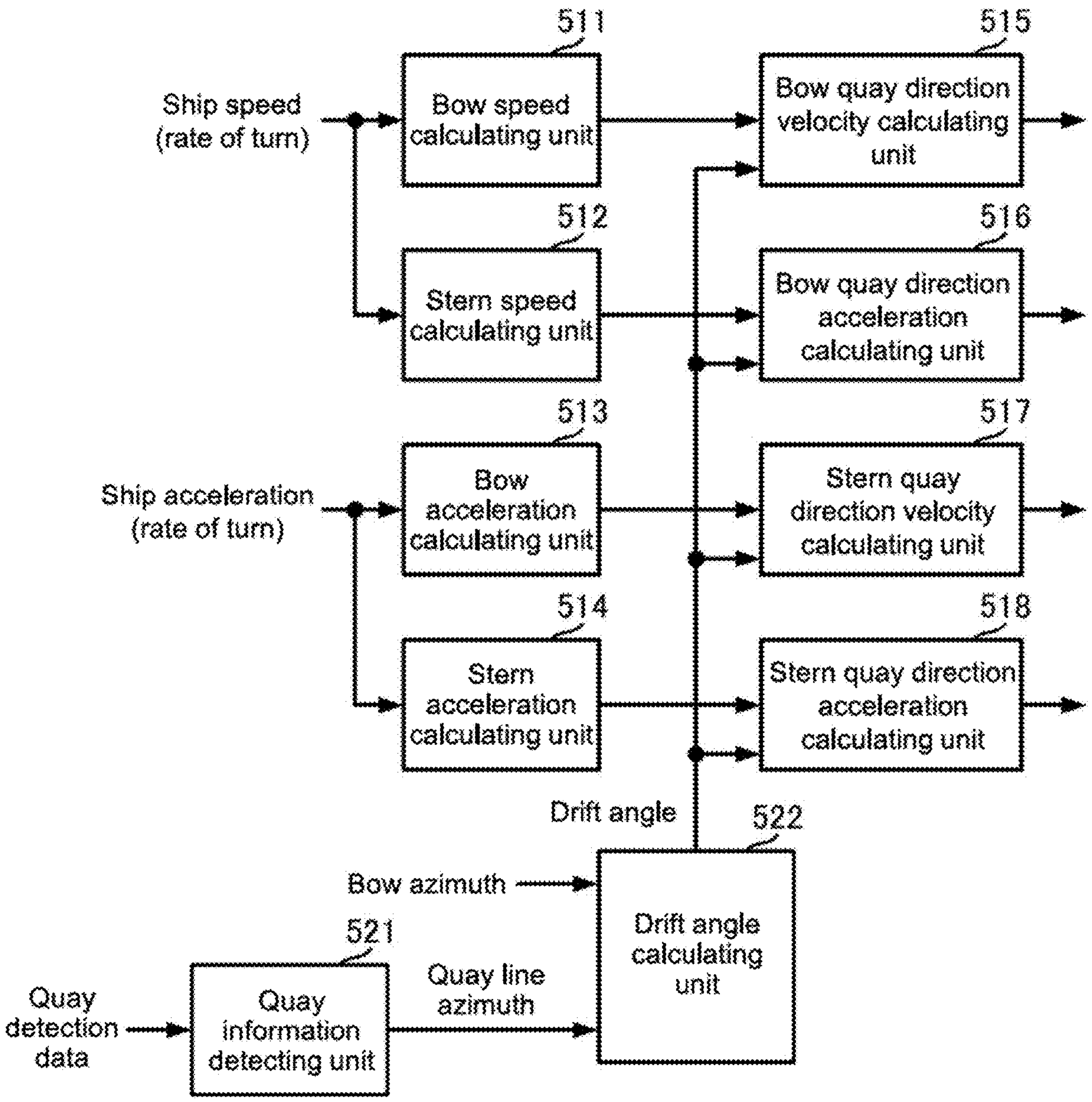
FIG. 15 is a functional block diagram of the processing circuitry of the navigation assistance device according to an embodiment of the disclosure.

As illustrated in FIG. 15, the processing circuitry 50 includes a bow speed calculating unit 511, a stern speed calculating unit 512, a bow acceleration calculating unit 513, a stern acceleration calculating unit 514, a bow quay direction velocity calculating unit 515, a bow quay direction acceleration calculating unit 516, a stern quay direction velocity calculating unit 517, a stern quay direction acceleration calculating unit 518, a quay information detecting unit 521, and a drift angle calculating unit 522.

The bow speed calculating unit 511 calculates a bow speed v91 at the bow position P91 from the ship speed in the ship body coordinate system. For example, if a speed sensor of the ship state detection sensor 31 is located at a position different from the bow position P91, such as the bridge 99, the bow speed v91 at the bow position P91 is calculated using the ship speed detected by the speed sensor and the rate of turn or the like. On the other hand, if the speed sensor is installed at the bow position P91, a value measured by this sensor is taken as the bow speed v91.

The stern speed calculating unit 512 calculates a stern speed v93 at the stern position P93*t* from the ship speed in the ship body coordinate system. For example, if the speed sensor is located at a position different from the stern position P93*t*, such as the bridge 99, the stern speed v93 at the stern position P93*t* is calculated using the ship speed detected by the speed sensor and the rate of turn or the like. On the other hand, if the speed sensor is installed at the stern position P93*t*, a value measured by this sensor is taken as the stern speed v93.

The bow acceleration calculating unit 513 calculates bow acceleration a91 at the bow position P91 from the ship acceleration in the ship body coordinate system. For example, if an acceleration sensor of the ship state detection sensor 31 is located at a position different from the bow position P91, such as the bridge 99, the bow acceleration a91 at the bow position P91 is calculated using the ship acceleration detected by the acceleration sensor and the rate of turn or the like. On the other hand, if the acceleration sensor is installed at the bow position P91, a value measured by this sensor is taken as the bow acceleration a91.

The stern acceleration calculating unit 514 calculates stern acceleration a93 at the stern position P93*t* from the ship acceleration in the ship body coordinate system. For example, if the acceleration sensor of the ship state detection sensor 31 is located at a position different from the stern position P93*t*, such as the bridge 99, the stern acceleration a93 at the stern position P93*t* is calculated using the ship acceleration detected by the acceleration sensor and the rate of turn or the like. On the other hand, if the acceleration sensor is installed at the stern position P93*t*, a value measured by this sensor is taken as the stern acceleration a93.

The quay information detecting unit 521 detects the quay line from the quay detection data. Specifically, for example, the quay information detecting unit 521 detects at least one straight line from multiple feature points detected, and detects, as the quay line 2111, a straight line that is most like the quay line using a method of maximum likelihood or the like. For the quay line 2111, the coordinates and azimuth of the quay line 2111 are detected in a coordinate system (imaging coordinate system) of the imaging data of the quay detection sensor 32. The quay line azimuth refers to an azimuth indicating a direction in which the quay line extends.

The drift angle calculating unit 522 calculates a drift angle θ being an angle formed between bow azimuth y and the quay line 2111 using the quay line azimuth and the bow azimuth ψ. On this occasion, since the coordinate systems of the quay line azimuth and the bow azimuth ψ are different in coordinate system, the drift angle calculating unit 522 performs a coordinate transformation to align their coordinate systems, and then calculates the drift angle θ.

The bow quay direction velocity calculating unit 515 calculates a bow quay direction velocity vh1 based on the bow speed v91 and the drift angle θ. More specifically, as illustrated in FIG. 21(B), the bow quay direction velocity calculating unit 515 calculates a bow direction bow velocity vs91 and a starboard port direction bow velocity vb91 using the bow speed v91 and the bow azimuth ψ.

The bow quay direction velocity calculating unit 515 calculates a quay direction component of the bow direction bow velocity vs91 from the bow direction bow velocity vs91 and the drift angle θ, and calculates a quay direction component of the starboard port direction bow velocity vb91 from the starboard port direction bow velocity vb91 and the drift angle θ. The bow quay direction velocity calculating unit 515 calculates the bow quay direction velocity vh1 by synthesis (vector addition) of the quay direction component of the bow direction bow velocity vs91 and the quay direction component of the starboard port direction bow velocity vb91.

The bow quay direction acceleration calculating unit 516 calculates bow quay direction acceleration ah1 based on the bow acceleration a91 and the drift angle θ. A method for calculating the bow quay direction acceleration ah1 is similar to that for the bow quay direction velocity vh1. The bow quay direction acceleration ah1 may also be calculated as a differential value of the bow quay direction velocity vh1 at multiple times.

The stern quay direction velocity calculating unit 517 calculates a stern quay direction velocity vt based on the stern speed v93 and the drift angle θ. A method for calculating the stern quay direction velocity vt is similar to that for the bow quay direction velocity vh1.

The stern quay direction acceleration calculating unit 518 calculates stern quay direction acceleration at based on the stern acceleration a93 and the drift angle θ. A method for calculating the stern quay direction acceleration at is similar to that for the bow quay direction velocity vh1. The stern quay direction acceleration at may also be calculated as a differential value of the stern quay direction velocity vt at multiple times.

By such a configuration, in the navigation assistance device 10, velocity and acceleration in a quay direction can be highly accurately calculated. Furthermore, in the navigation assistance device 10, the velocity and acceleration in a quay direction can be calculated separately for the bow position and the stern position. Accordingly, in the navigation assistance device 10, various predicted positions, predicted speeds, predicted times, predicted azimuths, and predicted drift angles described above and will be described later can be highly accurately calculated.

(Calculation System for Quay Distance and Arrival Prediction)

Figure 16:
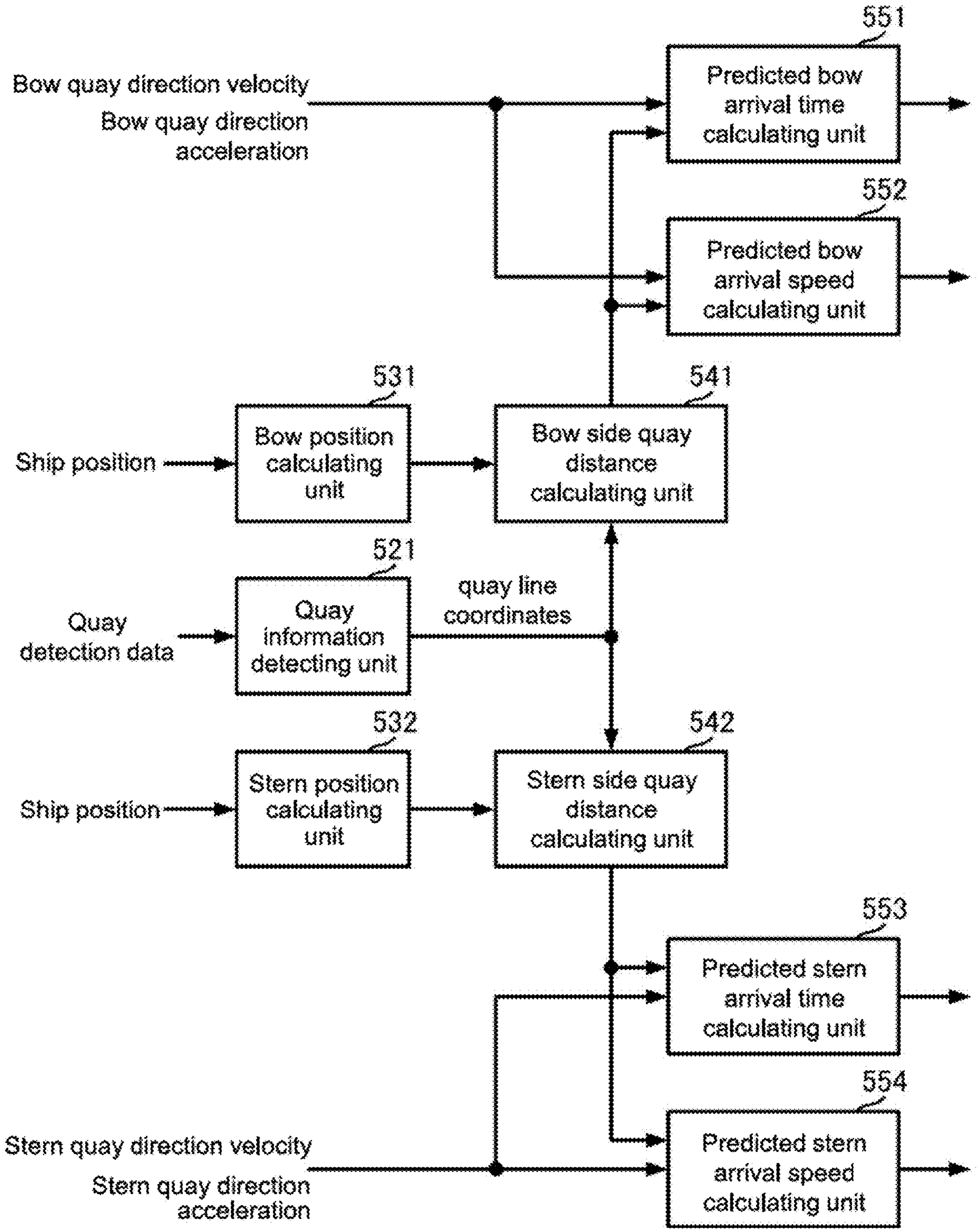
FIG. 16 is a functional block diagram of the processing circuitry of the navigation assistance device according to an embodiment of the disclosure.

As illustrated in FIG. 16, the processing circuitry 50 includes a quay information detecting unit 521, a bow position calculating unit 531, a stern position calculating unit 532, a bow side quay distance calculating unit 541, a stern side quay distance calculating unit 542, a predicted bow arrival time calculating unit 551, a predicted bow arrival speed calculating unit 552, a predicted stern arrival time calculating unit 553, and a predicted stern arrival speed calculating unit 554. In the present embodiment, arrival at the quay indicates a state in which at least one of the bow position P91 and the stern position P93*t* reaches the quay.

The bow position calculating unit 531 calculates the bow position P91 in the absolute coordinate system from the ship position. Specifically, the bow position calculating unit 531 stores in advance a coordinate relation between the installation coordinates of the positioning sensor that measures the ship position and the position coordinates of the bow position P91. The bow position calculating unit 531 calculates the position coordinates of the bow position P91 using the position coordinates in the absolute coordinate system measured by the positioning sensor and this coordinate relation.

The stern position calculating unit 532 calculates the stern position P93*t* in the absolute coordinate system from the ship position. A method for calculating the stern position P93*t* is similar to that for the bow position P91.

The bow side quay distance calculating unit 541 calculates a bow side quay distance DISh1 based on the bow position P91 and the quay line 2111. Specifically, the bow side quay distance calculating unit 541 stores in advance a coordinate transformation matrix between an image coordinate system and the absolute coordinate system. The bow side quay distance calculating unit 541 converts the quay line 2111 from the image coordinate system to the absolute coordinate system using this coordinate transformation matrix. The bow side quay distance calculating unit 541 calculates a length (bow side quay distance DISh1) of the perpendicular line from the bow position P91 to the quay line 2111 in the absolute coordinate system using a formula of a distance between a point and a line segment or the like. By finding an intersection point of the perpendicular line and the quay line 2111, the bow side quay distance calculating unit 541 calculates the coordinates of foot P21*h*1 of the perpendicular line.

The stern side quay distance calculating unit 542 calculates a stern side quay distance DISt and foot P21*t* of the perpendicular line based on the stern position P93*t* and the quay line 2111. A method for calculating the stern side quay distance DISt and the foot P21*t* of the perpendicular line is similar to that for the bow side quay distance DISh1.

The predicted bow arrival time calculating unit 551 calculates predicted bow arrival time taph based on the bow quay direction velocity vh1, the bow quay direction acceleration ah1, and the bow side quay distance DISh1. The predicted bow arrival time calculating unit 551 calculates the predicted bow arrival time taph using general relations of speed, acceleration, distance, and time.

The predicted bow arrival speed calculating unit 552 calculates a predicted bow arrival speed vaph based on the bow quay direction velocity vh1, the bow quay direction acceleration ah1, and the bow side quay distance DISh1. The predicted bow arrival speed calculating unit 552 calculates the predicted bow arrival speed vaph using general relations of speed, acceleration, distance, and time.

The predicted stern arrival time calculating unit 553 calculates predicted stern arrival time tapt based on the stern quay direction velocity vt, the stern quay direction acceleration at, and the stern side quay distance DISt. The predicted stern arrival time calculating unit 553 calculates the predicted stern arrival time tapt using general relations of speed, acceleration, distance, and time.

The predicted stern arrival speed calculating unit 554 calculates a predicted stern arrival speed vapt based on the stern quay direction velocity vt, the stern quay direction acceleration at, and the stern side quay distance DISt. The predicted stern arrival speed calculating unit 554 calculates the predicted stern arrival speed vapt using general relations of speed, acceleration, distance, and time.

By such a configuration, in the navigation assistance device 10, the predicted speed and predicted time at time of arrival at the quay can be highly accurately calculated. Accordingly, in the navigation assistance device 10, the state of the ship 90 at arrival at the quay can be highly accurately predicted, and effective information can be highly accurately provided during docking.

(Calculation System for Predicted Track)

First Example

Figure 17A:
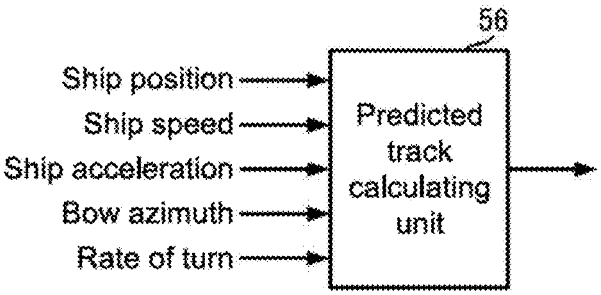
FIG. 17(A) and FIG. 17(B) are functional block diagrams of the processing circuitry of the navigation assistance device according to an embodiment of the disclosure.

As illustrated in FIG. 17(A), the processing circuitry 50 includes a predicted track calculating unit 56. The ship position, ship speed, ship acceleration, bow azimuth, and rate of turn are input to the predicted track calculating unit 56.

Based on the ship position, ship speed, ship acceleration, and prediction time (elapsed time from the present time), the predicted track calculating unit 56 calculates a predicted position of the ship 90 at the prediction time. Based on the bow azimuth and rate of turn, the predicted track calculating unit 56 calculates a predicted attitude (predicted bow azimuth) of the ship 90 at the prediction time. On this occasion, the predicted track calculating unit 56 can also calculate angular acceleration of turn from the rate of turn at multiple times in the past (preferably immediately before the present time), and calculate the predicted attitude (predicted bow azimuth) based on the bow azimuth, rate of turn, and angular acceleration of turn.

The predicted track calculating unit 56 calculates the predicted track (figure simulating at least the undocking and docking side of the ship 90) at the prediction time based on the predicted position and predicted attitude.

Second Example

Figure 17B:
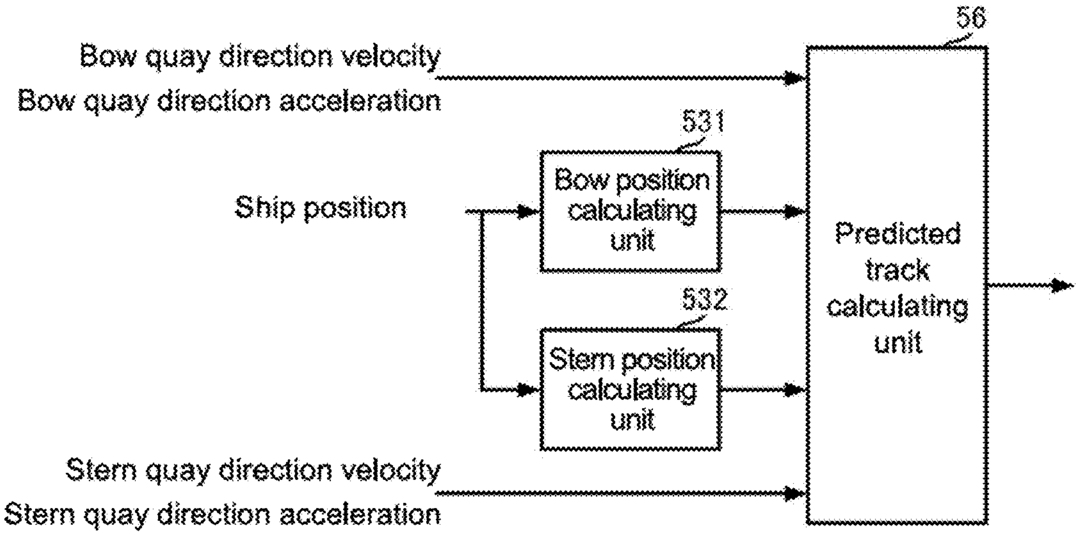

As illustrated in FIG. 17(B), the processing circuitry 50 includes a bow position calculating unit 531, a stern position calculating unit 532, and the predicted track calculating unit 56.

The predicted track calculating unit 56 calculates the predicted positions of the bow position P91 at multiple times based on the bow position P91, bow quay direction velocity vh, and bow quay direction acceleration ah at the present time. Specifically, the predicted track calculating unit 56 calculates the bow position P91 for each sampling time using general relations of speed, acceleration, distance, and time.

The predicted track calculating unit 56 calculates the predicted positions of the stern position P93*t* at multiple times based on the stern position P93*t*, stern quay direction velocity vt, and stern quay direction acceleration at at the present time. Specifically, the predicted track calculating unit 56 calculates the stern position P93*t* for each sampling time using general relations of speed, acceleration, distance, and time.

The predicted track calculating unit 56 generates, for each sampling time, a figure such as a line simulating the undocking and docking side, using the bow position P91 and stern position P93*t* for each sampling time.

By such a configuration, in the navigation assistance device 10, multiple predicted positions can be highly accurately calculated using speed and acceleration. Accordingly, in the navigation assistance device 10, the behavior of the ship 90 during docking can be highly accurately predicted, and effective information can be highly accurately provided during docking.

(Collision Prediction System)

Figure 18:
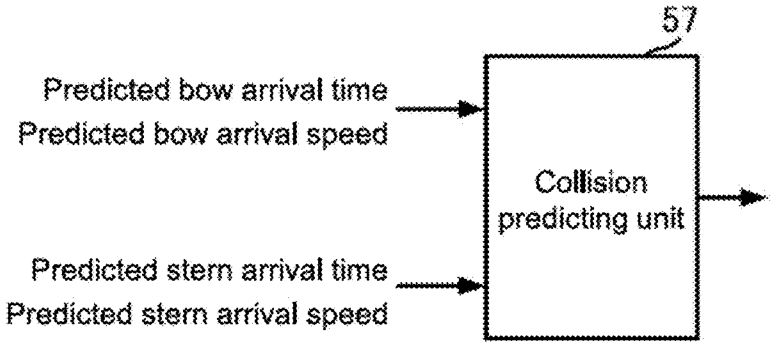
FIG. 18 is a functional block diagram of the processing circuitry of the navigation assistance device according to an embodiment of the disclosure.

As illustrated in FIG. 18, the processing circuitry 50 includes a collision predicting unit 57. Based on the predicted bow arrival time taph, predicted bow arrival speed vaph, predicted stern arrival time tapt, and predicted stern arrival speed vapt, the collision predicting unit 57 predicts a collision of the ship 90 with the quay.

Specifically, the collision predicting unit 57 compares the predicted bow arrival time taph with the predicted stern arrival time tapt, and selects the shorter one. If the predicted arrival speed of the selected side is higher than an upper limit docking speed, the collision predicting unit 57 predicts that a collision will occur. For example, if the predicted bow arrival time taph is shorter than the predicted stern arrival time tapt, and the predicted bow arrival speed vaph is higher than the upper limit docking speed, the collision predicting unit 57 predicts that the bow 91 will collide with the quay.

(System for Calculating State at Arrival at Quay)

First Example

Figure 19A:
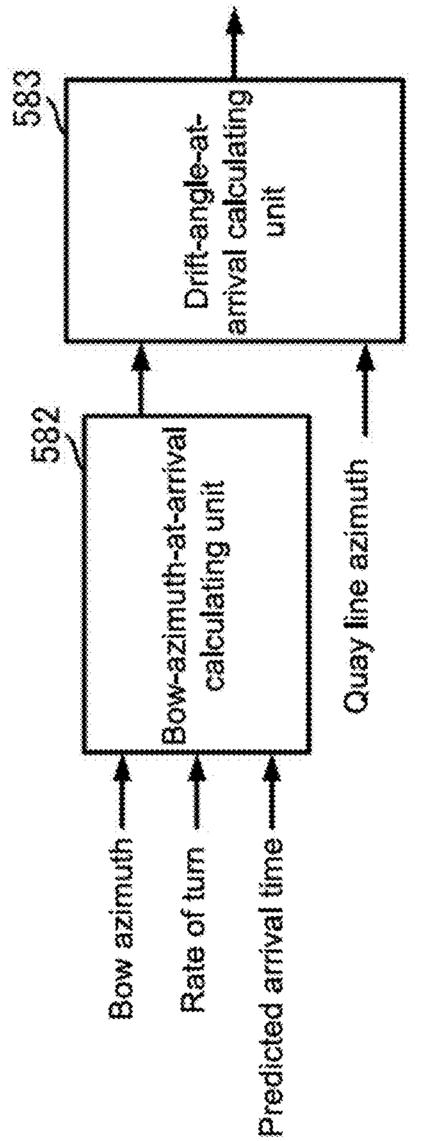
FIG. 19(A) and FIG. 19(B) are functional block diagrams of the processing circuitry of the navigation assistance device according to an embodiment of the disclosure.

As illustrated in FIG. 19(A), the processing circuitry 50 includes a bow-azimuth-at-arrival calculating unit 582 and a drift-angle-at-arrival calculating unit 583.

The bow-azimuth-at-arrival calculating unit 582 calculates a bow azimuth at arrival ψe based on the bow azimuth, rate of turn, and predicted arrival time.

The drift-angle-at-arrival calculating unit 583 calculates a drift angle at arrival θe (predicted drift angle) based on the bow azimuth at arrival ψe and the quay line azimuth. Specifically, the drift-angle-at-arrival calculating unit 583 calculates an angle formed between the bow azimuth at arrival ψe and the quay line azimuth in the absolute coordinate system, and sets the angle as the drift angle at arrival θe.

Second Example

Figure 19B:
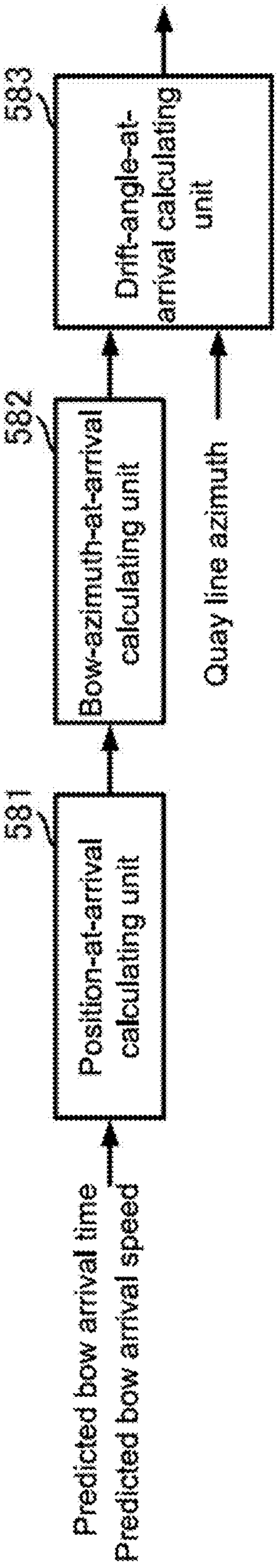

As illustrated in FIG. 19(B), the processing circuitry 50 includes a position-at-arrival calculating unit 581, the bow-azimuth-at-arrival calculating unit 582 and the drift-angle-at-arrival calculating unit 583.

Based on the predicted bow arrival time taph and the predicted stern arrival time tapt, the position-at-arrival calculating unit 581 calculates the bow position P91 in the case where the bow position P91 reaches the quay line 2111. Specifically, the position-at-arrival calculating unit 581 compares the predicted bow arrival time taph with the predicted stern arrival time tapt. If it is predicted that the bow position P91 will reach the quay line 2111 earlier than the stern position P93*t*, the position-at-arrival calculating unit 581 calculates the bow position P91 (docking position) and the stern position P93*t* at that point in time. On the other hand, if it is predicted that the stern position P93*t* will reach the quay line 2111 earlier than the bow position P91, the position-at-arrival calculating unit 581 calculates the stern position P93*t* (docking position) and the bow position P91 at that point in time.

Based on the bow position P91 and the stern position P93*t* at the time when the bow or stern reaches the quay line 2111, the bow-azimuth-at-arrival calculating unit 582 calculates the bow azimuth at arrival ψe. Specifically, by calculating a line parallel to the bow stern direction at arrival from the bow position P91 and the stern position P93*t* at arrival, and detecting an azimuth of this line in the absolute coordinate system, the bow-azimuth-at-arrival calculating unit 582 calculates the bow azimuth at arrival ψe (predicted azimuth angle).

The drift-angle-at-arrival calculating unit 583 calculates the drift angle at arrival θe (predicted drift angle) based on the bow azimuth at arrival ψe and the quay line azimuth.

By such a configuration, in the navigation assistance device 10, the drift angle (drift angle at arrival θe) at the time when the ship 90 reaches the quay can be highly accurately predicted. Accordingly, in the navigation assistance device 10, effective information can be highly accurately provided during docking.

(Method for Calculating Quay Direction Distance and Quay Direction Acceleration)

Figure 22A:
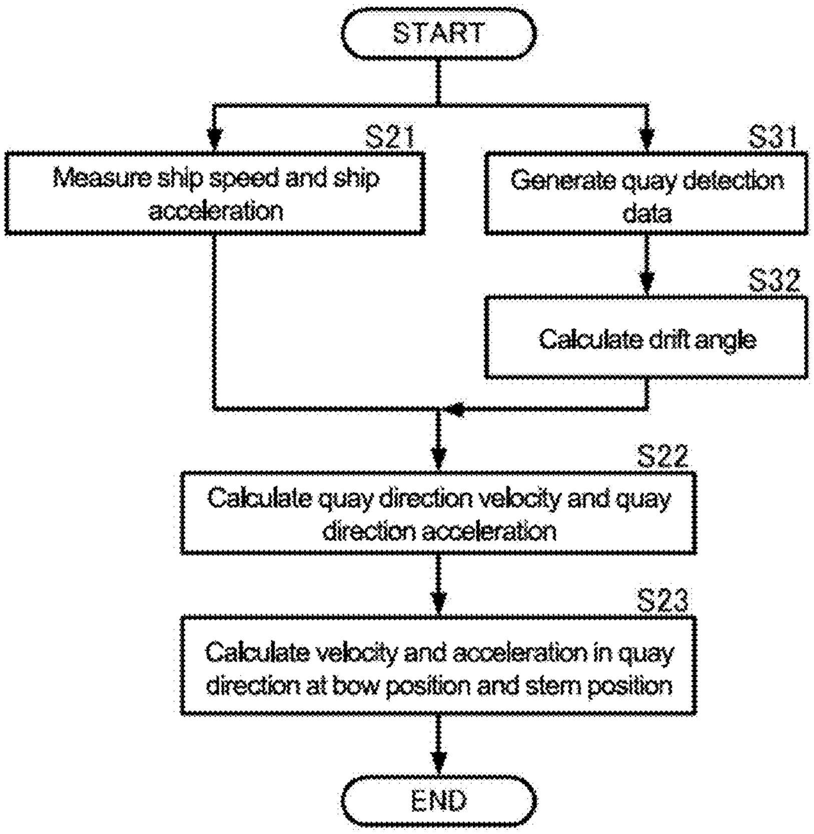
FIG. 22(A) and FIG. 22(B) are flowcharts illustrating one example of a method for calculating quay direction distance and quay direction acceleration in the navigation assistance method according to the present embodiment.
Figure 22B:
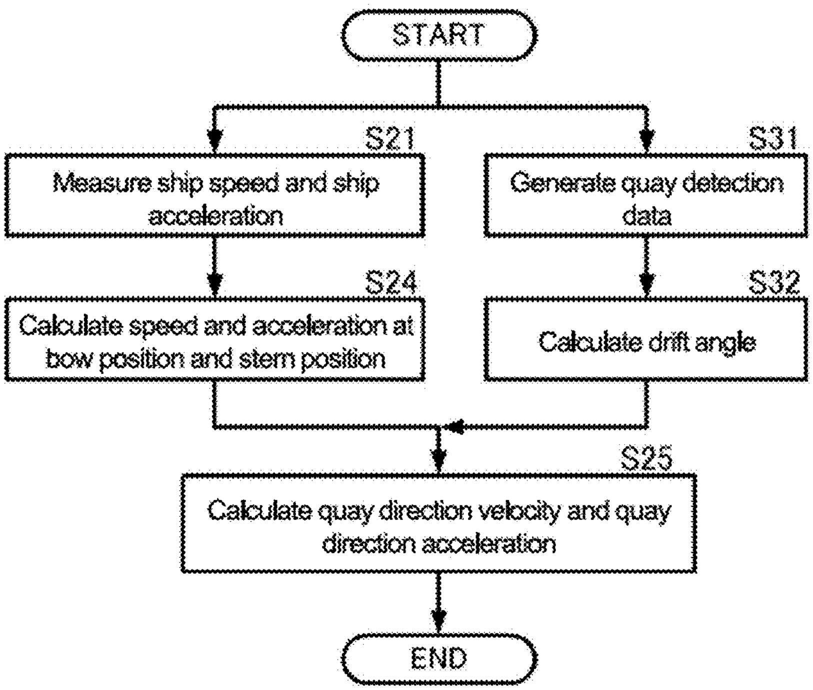

FIG. 22(A) and FIG. 22(B) are flowcharts illustrating one example of a method for calculating quay direction distance and quay direction acceleration in the navigation assistance method according to the present embodiment. Since the specific content of each processing is described above, the description here will be omitted as appropriate.

First Example

As illustrated in FIG. 22(A), in the navigation assistance device 10, the ship speed and ship acceleration are measured by the ship state detection sensor 31 (S21).

In the navigation assistance device 10, quay detection data is generated by the quay detection sensor 32 (S31). In the navigation assistance device 10, the drift angle θ is calculated in the processing circuitry 50 (S32).

In the navigation assistance device 10, based on the ship speed, ship acceleration, and drift angle θ, the quay direction velocity and quay direction acceleration at the position of the ship state detection sensor 31 are calculated in the processing circuitry 50 (S22).

In the navigation assistance device 10, based on the quay direction velocity and quay direction acceleration at the position of the ship state detection sensor 31 as well as the relationship between the sensor position, bow position P91, and stern position P93*t*, the bow quay direction velocity vh1 and bow quay direction acceleration ah1 at the bow position P91 as well as the stern quay direction velocity vt and stern quay direction acceleration at at the stern position P93*t* are calculated in the processing circuitry 50 (S23).

Second Example

As illustrated in FIG. 22(B), in the navigation assistance device 10, the ship speed and ship acceleration are measured by the ship state detection sensor 31 (S21). In the navigation assistance device 10, the bow speed v91, bow acceleration a91, stern speed v93, and stern acceleration a93 are calculated from the ship speed in the processing circuitry 50 (S24).

In the navigation assistance device 10, quay detection data is generated by the quay detection sensor 32 (S31). In the navigation assistance device 10, the drift angle θ is calculated in the processing circuitry 50 (S32).

In the navigation assistance device 10, based on the bow speed v91 and bow acceleration a91 at the bow position P91, the stern speed v93 and stern acceleration a93 at the stern position P93*t*, and the drift angle θ, the bow quay direction velocity vh1 and bow quay direction acceleration ah1 at the bow position P91 as well as the stern quay direction velocity vt and stern quay direction acceleration at at the stern position P93*t* are calculated in the processing circuitry 50 (S25).

(Method for Calculating Predicted Speed and Predicted Drift Angle at Arrival at Quay)

Figure 23A:
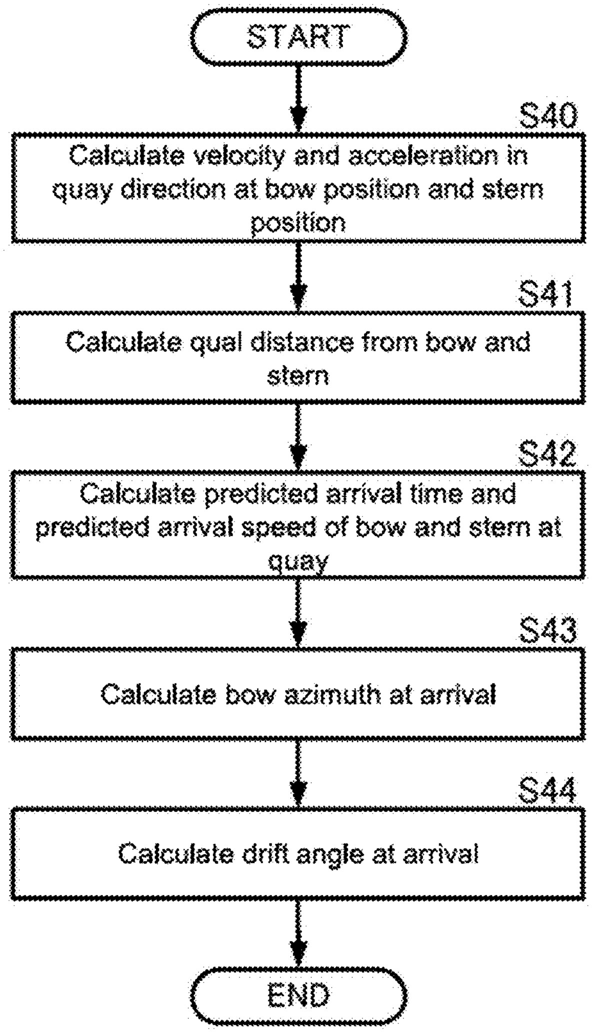
FIG. 23(A) and FIG. 23(B) are flowcharts illustrating one example of a method for calculating predicted speed and predicted drift angle at arrival at the quay in the navigation assistance method according to the present embodiment.
Figure 23B:
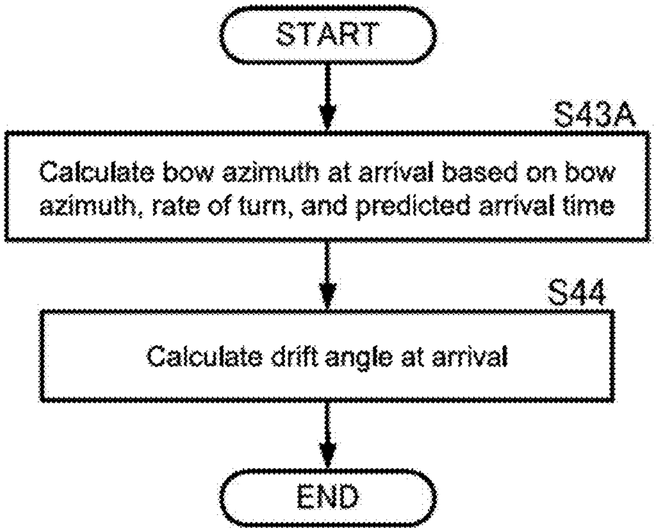

FIG. 23(A) and FIG. 23(B) are flowcharts illustrating one example of a method for calculating predicted speed and predicted drift angle at arrival at the quay in the navigation assistance method according to the present embodiment. Since the specific content of each processing is described above, the description here will be omitted as appropriate.

First Example

In step S40 in FIG. 23(A), similar processing to that in FIG. 22(A) and FIG. 22(B) is performed, and the description thereof is omitted.

In the navigation assistance device 10, based on the bow position P91, the stern position P93*t*, and the quay line 2111, the bow side quay distance DISh1 and the stern side quay distance DISt are calculated in the processing circuitry 50 (S41).

In the navigation assistance device 10, based on the bow quay direction velocity vh1, bow quay direction acceleration ahl, stern quay direction velocity vt, stern quay direction acceleration at, bow side quay distance DISh1, and stern side quay distance DISt, the predicted bow arrival time taph, predicted stern arrival time tapt, predicted bow arrival speed vaph, and predicted stern arrival speed vapt are calculated in the processing circuitry 50 (S42).

In the navigation assistance device 10, based on the bow position P91 and the stern position P93*t* at the time when the bow or stern reaches the quay line 2111, the bow azimuth at arrival ψe is calculated in the processing circuitry 50 (S43).

In the navigation assistance device 10, based on the bow azimuth at arrival ψe and the quay azimuth, the drift angle at arrival θe is calculated in the processing circuitry 50 (S44).

Second Example

As illustrated in FIG. 23(B), in the navigation assistance device 10, based on the bow azimuth y, rate of turn, and predicted arrival time, the bow azimuth at arrival ψe is calculated in the processing circuitry 50 (S43A). The predicted arrival time is calculated in the same manner as in the processing in FIG. 23(A).

In the navigation assistance device 10, based on the bow azimuth at arrival ψe and the quay azimuth, the drift angle at arrival θe is calculated in the processing circuitry 50 (S44).

Terms

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE NUMERALS

10: navigation assistance device
20: display
22, 22A: bird's-eye view window
23: numerical data display window
24, 24A: ship speed display window
25: azimuth relationship display window
26: arrival prediction information display window
27: warning display window
28: quay arrival prediction display window
31: ship state detection sensor
32: quay detection sensor
41, 42: camera
50: processing circuitry
56: predicted track calculating unit
57: collision predicting unit
60: image synthesizing unit
90: ship
91: bow
92: stern
93: starboard
94: port
99: bridge
200: display screen
211: bow side image window
211A: bow side image window
212: stern side image window
220: current state mark
220*tp*: past track mark
231: bow side quay distance display window
232: bridge quay reference point distance display window
233: stern side quay distance display window
234: drift angle display window

241: bow quay direction velocity
242: stern quay direction velocity
251: azimuth display window
252: rate of turn display window
261: bow arrival speed
262: stern arrival speed
263: drift angle at arrival
283: predicted drift angle
511: bow speed calculating unit
512: stern speed calculating unit
513: bow acceleration calculating unit
514: stern acceleration calculating unit
515: bow quay direction velocity calculating unit
516: bow quay direction acceleration calculating unit
517: stern quay direction velocity calculating unit
518: stern quay direction acceleration calculating unit
521: quay information detecting unit
522: drift angle calculating unit
531: bow position calculating unit
532: stern position calculating unit
541: bow side quay distance calculating unit
542: stern side quay distance calculating unit
551: predicted bow arrival time calculating unit
552: predicted bow arrival speed calculating unit
553: predicted stern arrival time calculating unit
554: predicted stern arrival speed calculating unit
581: position-at-arrival calculating unit
582: bow-azimuth-at-arrival calculating unit
583: drift-angle-at-arrival calculating unit
2111: quay line
2112, 2112A, 2212A: predicted position
2113: bow side quay distance
2119: simplified image
2123: stern side quay distance
2124: bridge quay reference point distance
2129: simplified image
2212: predicted track mark
2311: bow side quay distance
2321: bridge quay reference point distance
2322, 2630, 2830: mark
2331: stern side quay distance
2341: drift angle
2410, 2410A, 2420, 2420A, 2430, 2430A: direction mark
2491, 2691, 2891: bow mode mark
2492, 2692, 2892: stern mode mark
2610: bow arrival direction
2620: stern arrival direction
2811: bow quay arrival time
2812: bow quay direction velocity
2821: stern quay arrival time
2822: stern quay direction velocity

The invention claimed is:

1. A navigation assistance device, comprising:
a ship state detection sensor configured to detect a bow azimuth and a ship speed; and
processing circuitry configured to:
detect a quay line of a quay,
calculate a drift angle which is an angle formed between a bow stern direction of a ship and a direction in which the quay line extends, based on the bow azimuth and the quay line, and
calculate a quay direction velocity in a direction orthogonal to the quay line based on the ship speed and the drift angle.

2. The navigation assistance device according to claim 1, wherein:
the ship state detection sensor also detects a ship position.

3. The navigation assistance device according to claim 2, wherein
the ship state detection sensor detects a ship acceleration; and
the processing circuitry calculates a quay direction acceleration in the direction orthogonal to the quay line based on the ship acceleration and the drift angle.

4. The navigation assistance device according to claim 2, wherein
the processing circuitry calculates, as the quay direction velocity, a bow quay direction velocity at a bow position of the ship and a stern quay direction velocity at a stern position of the ship.

5. The navigation assistance device according to claim 3, wherein
the processing circuitry calculates, as the quay direction acceleration, a bow quay direction acceleration at a bow position of the ship and a stern quay direction velocity at a stern position of the ship.

6. The navigation assistance device according to claim 4, wherein
the processing circuitry calculates the quay direction velocity at equal time intervals.

7. The navigation assistance device according to claim 5, wherein
the processing circuitry calculates the quay direction acceleration at equal time intervals.

8. A navigation assistance method, comprising:
detecting a bow azimuth and a ship speed by a ship state detection sensor;
detecting a quay line of a quay;
calculating, by processing circuitry, a drift angle which is an angle formed between a bow stern direction of a ship and a direction in which the quay line extends, based on the bow azimuth and the quay line; and
calculating, by the processing circuitry, a quay direction velocity in a direction orthogonal to the quay line based on the ship speed and the drift angle.

9. The navigation assistance method according to claim 8, comprising:
detecting a ship position.

10. The navigation assistance method according to claim 9, comprising:
detecting a ship acceleration; and
calculating a quay direction acceleration in the direction orthogonal to the quay line based on the ship acceleration and the drift angle.

11. The navigation assistance method according to claim 9, comprising:
calculating, as the quay direction velocity, a bow quay direction velocity at a bow position of the ship and a stern quay direction velocity at a stern position of the ship.

12. The navigation assistance method according to claim 10, comprising:
calculating, as the quay direction acceleration, a bow quay direction acceleration at a bow position of the ship and a stern quay direction acceleration at a stern position of the ship.

13. The navigation assistance method according to claim 11, comprising:
calculating the quay direction velocity at equal time intervals.

14. The navigation assistance method according to claim 12, comprising:

calculating the quay direction acceleration at equal time intervals.

* * * * *